US008280901B2

(12) United States Patent
McDonald

(10) Patent No.: US 8,280,901 B2
(45) Date of Patent: Oct. 2, 2012

(54) METHOD AND SYSTEM FOR DISPLAYING SEARCH RESULTS

(75) Inventor: John Bradley McDonald, Toronto (CA)

(73) Assignee: Masterfile Corporation, Toronot (CA)

( * ) Notice: Subject to any disclaimer, the term of this patent is extended or adjusted under 35 U.S.C. 154(b) by 468 days.

(21) Appl. No.: 12/202,706

(22) Filed: Sep. 2, 2008

(65) Prior Publication Data

US 2009/0187558 A1    Jul. 23, 2009

Related U.S. Application Data

(60) Provisional application No. 61/006,262, filed on Jan. 3, 2008.

(51) Int. Cl.
*G06F 17/30* (2006.01)

(52) U.S. Cl. ........ 707/766; 707/736; 707/769; 707/722; 707/706; 715/204; 715/771; 715/779; 715/792

(58) Field of Classification Search .................. None
See application file for complete search history.

(56) References Cited

U.S. PATENT DOCUMENTS

| | | | | |
|---|---|---|---|---|
| 5,027,709 A * | 7/1991 | Slagle | ........... | 102/427 |
| 5,220,625 A * | 6/1993 | Hatakeyama et al. | ........ | 715/809 |
| 5,600,812 A * | 2/1997 | Park | ............ | 711/200 |
| 5,627,835 A * | 5/1997 | Witter | ........... | 370/320 |
| 5,675,788 A * | 10/1997 | Husick et al. | .......... | 1/1 |
| 5,726,982 A * | 3/1998 | Witter | ........... | 370/335 |
| 5,742,816 A * | 4/1998 | Barr et al. | ........... | 707/728 |
| 5,768,581 A * | 6/1998 | Cochran | ......... | 707/741 |
| 5,884,079 A * | 3/1999 | Furusawa | ......... | 717/109 |
| 5,911,138 A * | 6/1999 | Li et al. | .......... | 1/1 |
| 6,247,009 B1 * | 6/2001 | Shiiyama et al. | ....... | 1/1 |
| 6,275,406 B1 * | 8/2001 | Gibson et al. | ......... | 365/49.17 |
| 6,295,576 B1 * | 9/2001 | Ogura et al. | ......... | 711/108 |
| 6,324,496 B1 * | 11/2001 | Alur et al. | .......... | 703/17 |
| 6,326,962 B1 * | 12/2001 | Szabo | ........... | 715/762 |
| 6,330,293 B1 * | 12/2001 | Klank et al. | .......... | 375/344 |
| 6,351,570 B1 * | 2/2002 | Kobayashi | ............ | 382/250 |
| 6,424,560 B2 * | 7/2002 | Nishii et al. | ........... | 365/154 |
| 6,539,373 B1 * | 3/2003 | Guha | ............. | 1/1 |
| 6,718,518 B1 * | 4/2004 | Plow et al. | ........... | 715/205 |
| 6,912,532 B2 * | 6/2005 | Andersen | ........... | 1/1 |
| 6,928,430 B1 * | 8/2005 | Chien et al. | .......... | 1/1 |
| 6,956,756 B2 * | 10/2005 | Ogura | ......... | 365/49.17 |
| 6,980,452 B2 * | 12/2005 | Ogura | ......... | 365/49.17 |
| 7,016,058 B1 * | 3/2006 | Tabata | ........... | 358/1.15 |
| 7,149,982 B1 * | 12/2006 | Duperrouzel et al. | ........ | 715/788 |
| 7,170,875 B2 * | 1/2007 | Tanno et al. | ........... | 370/335 |

(Continued)

OTHER PUBLICATIONS

Hoeber, Orland et al., "Interactive Web Information Retrieval Using Wordbars," 2006, IEEE International Conference on Web Intelligence 2006, pp. 875-882.*

(Continued)

*Primary Examiner* — Farhan Syed
(74) *Attorney, Agent, or Firm* — Bereskin & Parr LLP/ S.E.N.C.R.L., s.r.l.

(57) ABSTRACT

Methods and systems related to the display of primary and secondary search results are provided. Search results are displayed to the user without requiring the user to perform any tasks to view the entire set of search results. The user may then request secondary searches based on the displayed primary search results through performing a single action. Secondary search results are displayed along with the primary search results.

28 Claims, 16 Drawing Sheets

U.S. PATENT DOCUMENTS

| | | | | |
|---|---|---|---|---|
| 7,293,017 B2* | 11/2007 | Hurst-Hiller et al. | | 707/740 |
| 7,302,425 B1* | 11/2007 | Bernstein et al. | | 1/1 |
| 7,383,510 B2* | 6/2008 | Pry | | 715/745 |
| 7,397,682 B2* | 7/2008 | Ogura | | 365/49.1 |
| 7,587,392 B2* | 9/2009 | Jhaveri et al. | | 1/1 |
| 7,627,826 B2* | 12/2009 | Pry | | 715/745 |
| 7,630,922 B2* | 12/2009 | Namba et al. | | 705/26.62 |
| 7,747,612 B2* | 6/2010 | Thun et al. | | 707/722 |
| 7,747,613 B2* | 6/2010 | Freeman et al. | | 707/722 |
| 7,747,614 B2* | 6/2010 | Freeman et al. | | 707/722 |
| 7,752,124 B2* | 7/2010 | Green et al. | | 705/38 |
| 7,752,557 B2* | 7/2010 | Hoeber et al. | | 715/761 |
| 7,765,225 B2* | 7/2010 | Robert | | 707/765 |
| 7,793,047 B2* | 9/2010 | Asano | | 711/122 |
| 7,835,543 B2* | 11/2010 | Yoshinaga et al. | | 382/103 |
| 7,836,060 B1* | 11/2010 | Rennison | | 707/749 |
| 7,921,106 B2* | 4/2011 | Chen et al. | | 707/723 |
| 7,958,103 B1* | 6/2011 | Tang et al. | | 707/706 |
| 7,991,758 B2* | 8/2011 | Beeston et al. | | 707/707 |
| 2002/0087667 A1* | 7/2002 | Andersen | | 709/220 |
| 2003/0187968 A1* | 10/2003 | McKnight | | 709/223 |
| 2006/0007875 A1* | 1/2006 | Andersen | | 370/314 |
| 2006/0059440 A1* | 3/2006 | Pry | | 715/838 |
| 2008/0021878 A1* | 1/2008 | Jeong | | 707/3 |
| 2008/0201326 A1* | 8/2008 | Cotter et al. | | 707/5 |
| 2008/0276185 A1* | 11/2008 | Pry | | 715/760 |
| 2009/0103779 A1* | 4/2009 | Loehlein et al. | | 382/103 |
| 2009/0187558 A1* | 7/2009 | McDonald | | 707/5 |
| 2012/0174023 A1* | 7/2012 | Kenemer et al. | | 715/781 |

OTHER PUBLICATIONS

Hoeber, Orland et al., "The Visual Exploration of Web Search Results Using HotMap," 2006, 10th Conference on Information Visualization 2006, pp. 157-165.*

Hoeber, Orland et al., "Visualization Support for Interactive Query Refinement," IEEE International Conference on Web Intelligence 2005, pp. 657-665.*

Andrews, K., et al., "Search Result Visualisation with xFind," 2001, Proceedings of the 2nd International Workshop on User Interfaces to Data Intensive Systems, 2001 pp. 50-58.*

* cited by examiner

FIG. 16

METHOD AND SYSTEM FOR DISPLAYING SEARCH RESULTS

CROSS REFERENCES TO RELATED APPLICATIONS

The present application claims priority from U.S. Provisional Patent Application No. 61/006,262, filed on Jan. 2, 2008, which is incorporated by reference.

FIELD

The embodiments described herein relate generally to electronic data searching, and more specifically to improved methods and for displaying and manipulating electronic data search results.

BACKGROUND

Many people use the Internet as their first resource when attempting to perform research and ascertain information. As a result, search engines have become increasingly popular.

A great deal of research and effort is undertaken to provide users with search results that are easy to access and navigate. However, such methods used to display and interact with search results require the user to perform multiple actions repeatedly to filter through a large body of search results. Furthermore, where users wish to retrace their steps in order to return to a previous result they had viewed or manipulated, it is often difficult to do so without expending a lot of effort, as many of the user's actions have lead them away from their initial set of search results.

SUMMARY

The invention provides, in one aspect, a method of displaying search results of data in a search and display window, the method comprising:
a) displaying a primary search result in a primary search results portion of the search and display window using a primary search algorithm in response to a primary search query, wherein the primary search result comprises a primary data set, wherein each datum in the primary data set is displayed using an electronic representation of the datum;
b) receiving a first user selection of one of the electronic representations of the primary search result; and
c) displaying a first secondary search result in a secondary search results portion of the search and display window matching one or more parameters associated with the first user selection using a secondary search algorithm, wherein the first secondary search result comprises a secondary data set, wherein each datum in the secondary data set is displayed using an electronic representation of the datum.

In another aspect, the invention provides a system for displaying search results in a search and display window, the system comprising:
a database for storing data;
a display adapted to display the search and display window; and
a processor adapted to receive a primary search query, conduct a primary search on the data based on a primary search algorithm, and display a primary search result in a primary search portion of the search and display window, wherein,
the primary search result comprises a primary data set and each datum in the primary data set is displayed using an electronic representation of the datum; and
when a first user selection of one of the electronic representations of the primary search result is made, a first secondary search result is displayed in a secondary search portion of the search and display window matching one or more parameters associated with the first user selection using a secondary search algorithm wherein the first secondary search result comprises a secondary data set, wherein each datum in the secondary data set is displayed using an electronic representation of the datum.

In another aspect, the invention provides a method of displaying search results of data, the method comprising:
a) receiving a first search term;
b) obtaining a primary search result based on the first search term;
c) displaying the primary search result using an electronic representation of each datum in the primary search result;
d) receiving a second search term;
e) receiving a first user selection of one of the electronic representations of the primary search result;
e) obtaining a first secondary search result based on the second search term wherein each datum in the first secondary search result is similar to the first user selection.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment and in which:

FIG. 16 is a sample illustration of a search window used to display text based search results.

DETAILED DESCRIPTION

Figure 1:
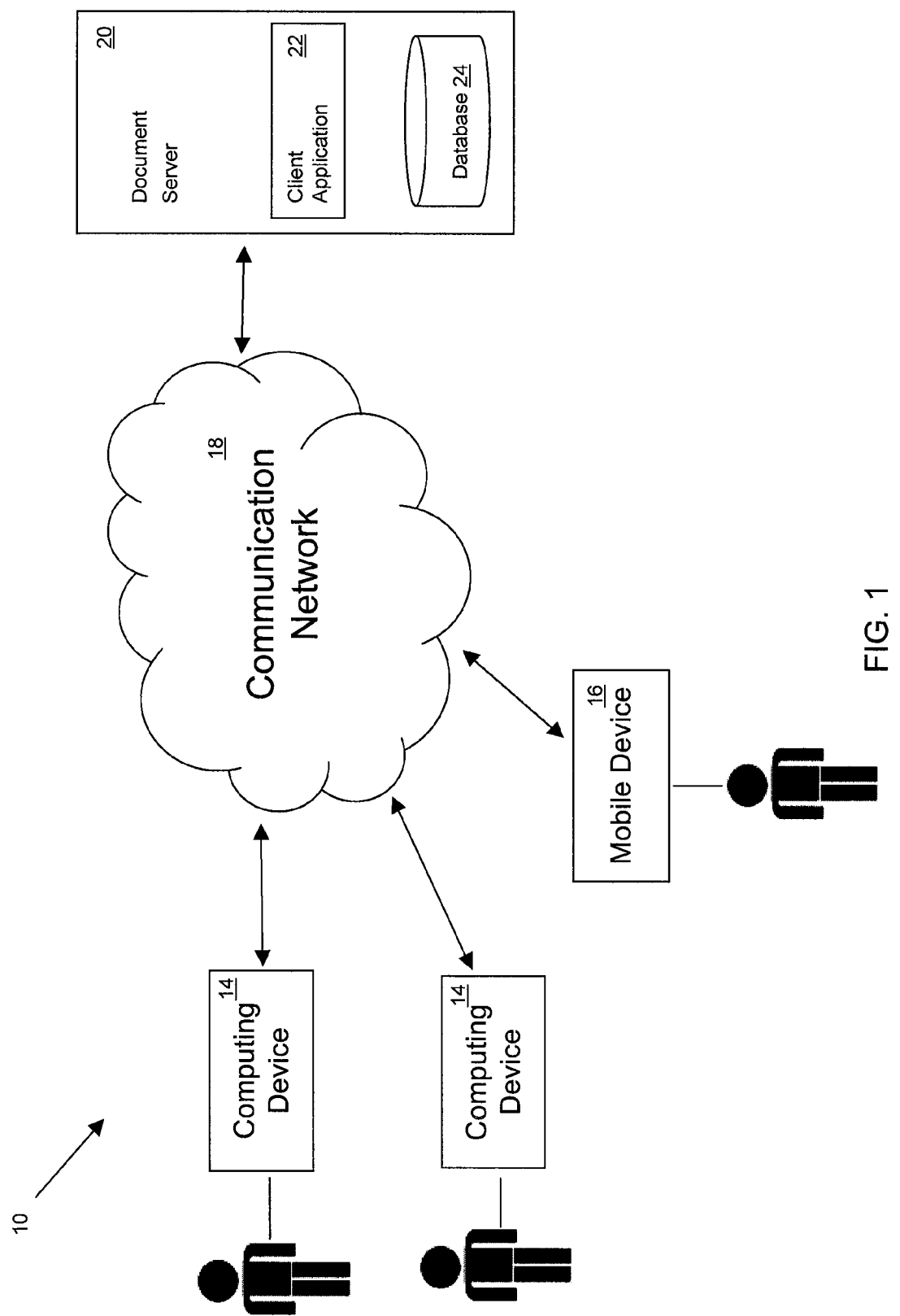
FIG. 1 is a block diagram of a customizable search system according to an embodiment of the present invention.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The embodiments of the systems and methods described herein may be implemented in hardware or software, or a combination of both, However, preferably, these embodiments are implemented in computer programs executing on programmable computers, each comprising at least one processor, a data storage system (including volatile and non-volatile memory and/or storage elements), at least one input device, and at least one output device. For example, and without limitation, the programmable computers may be a mainframe computer, server, personal computer, laptop, personal data assistant, or cellular telephone. Program code is applied to input data to perform the functions described herein and generate output information. The output information is applied to one or more output devices in any suitable fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer-usable instructions for one or more processors. The medium may be provided in any suitable form, including one or more diskettes, compact disks, tapes, chips, wireline transmissions, satellite transmissions, internet transmission or downloading, magnetic and electronic storage media, digital and analog signals, and the like. The computer-usable instructions may also be in various forms, including compiled and non-compiled code.

The systems and methods described herein, relate to improved methods for processing and displaying search results. Users may conduct searches of various databases, wherein search results are presented to the user upon a display device. Search results are presented to the user after a user conducts a primary search upon an interface provided to the user. The primary search is conducted by the user, where the user enters a search query. Upon entering a search query, a primary search algorithm is executed wherein, the primary search algorithm attempts to find the electronic content that matches the search criteria. The search results are then displayed in a manner that allow a user to inspect and interact with the search results without the need to load additional pages for the display of the entirety of search results. Additionally, users may engage in secondary searches based upon or in addition to the results of the primary search, by interacting with one of the search results that have been displayed.

Reference is now made to FIG. 1, where a block diagram illustrating components of the customizable search system 10 is shown in an exemplary embodiment. The customizable search system 10 allows users to conduct searches for files of varying types and displays the search results to the user. The search results are displayed to the user such that the user may interact with and view the search results without the need to scroll to an end of a page and load multiple pages. As described below, the user is also able to perform secondary searches based on the primary search results that are displayed by performing a single action, such as clicking on a displayed search result. The various functionalities that are available to the user through use of the customizable search system 10 are described in further detail below.

The customizable search system 10, in an exemplary embodiment, permits users to use computing devices 14 or mobile devices 16 for purposes of retrieving information by conducting a search of databases. The computing devices 14 or mobile devices 16 may access a document server 20 for purposes of conducting the search. The computing devices 14 or mobile devices 16 access the document server 20 in response to a search query. In one embodiment, the document server 20 has associated with it a client application 22, and a file database 24. A user accesses the document server 20 to search for one or more electronic files based on various search criteria that they specify in a primary search query. The various queries that may be performed along with the display of the search results are further described below The computing devices 14 are any devices that may be accessed by the user to conduct searches. Such devices may have a display screen, an input device and access a client application 22. The components of the computing devices 14 are described in further detail with regard to FIG. 2. The computing device 14, in an exemplary embodiment, may include, but is not limited to, a desktop computer, laptop computer, handheld computer, or server type computer. The user may also access the system 10 through use of a mobile computing device 16. The mobile computing device 16 may be a wireless handheld device, cellular phone, personal assistant, or similar device. The mobile device 16 may be any device that has a display screen and a input device associated with it may be used with the system 10.

For purposes of example, the system is described herein with respect to searches that are conducted on the Internet. Users will access a website and conduct a search. The electronic files in an exemplary embodiment may be any type of file that a user wishes to search for and that have associated with them one or more attributes that are used to index the respective files. Attributes associated with a file, may be associated with the content of the file (i.e. what is captured in an actual image or what is contained in the text of the document) or with the file generally (i.e. size of the file). The electronic files may be representative of, but are not limited to representations of images, word processing documents, audio files, video files, spread sheets, or presentations. For purposes of example, the system 10 is described herein with respect to the search and display of images. While the systems and methods described herein do relate to methods that may be accessed through the Internet, it should be noted that the methods of searching, customizing, displaying and interacting with search results may be related to searches that are conducted directly on local computer stations and mobile devices.

The communication network 18 in an exemplary embodiment is any network that allows for data communication between computing devices. In an exemplary embodiment, the communication network 18 is the Internet. In alternative embodiments, the communication network may be a wide area network (WAN), local area network (LAN), Intranet, or any other communication medium that allows for data transfer. In alternative embodiments, the computing stations may have direct access to the client application where searches are being conducted locally. In such embodiments, there is no need for the communication network 18.

The document server 20 in an exemplary embodiment is a server-type computing device that has associated with it a client application 22 and a file database 24. The client application 22, in an exemplary embodiment is a software application that receives and processes search queries as described below. The file database 24 in an exemplary embodiment stores the various electronic files that may be the subject of a user's search. The file as described above, may be any type of files that may be searched based on user specified criteria. Files may include, but are not limited to digital photographs, image files, word processing document, text files, pdf files, graphic files, and other similar files. For purposes of example, the methods and systems are described herein in relation to digital photographs.

Figure 2:
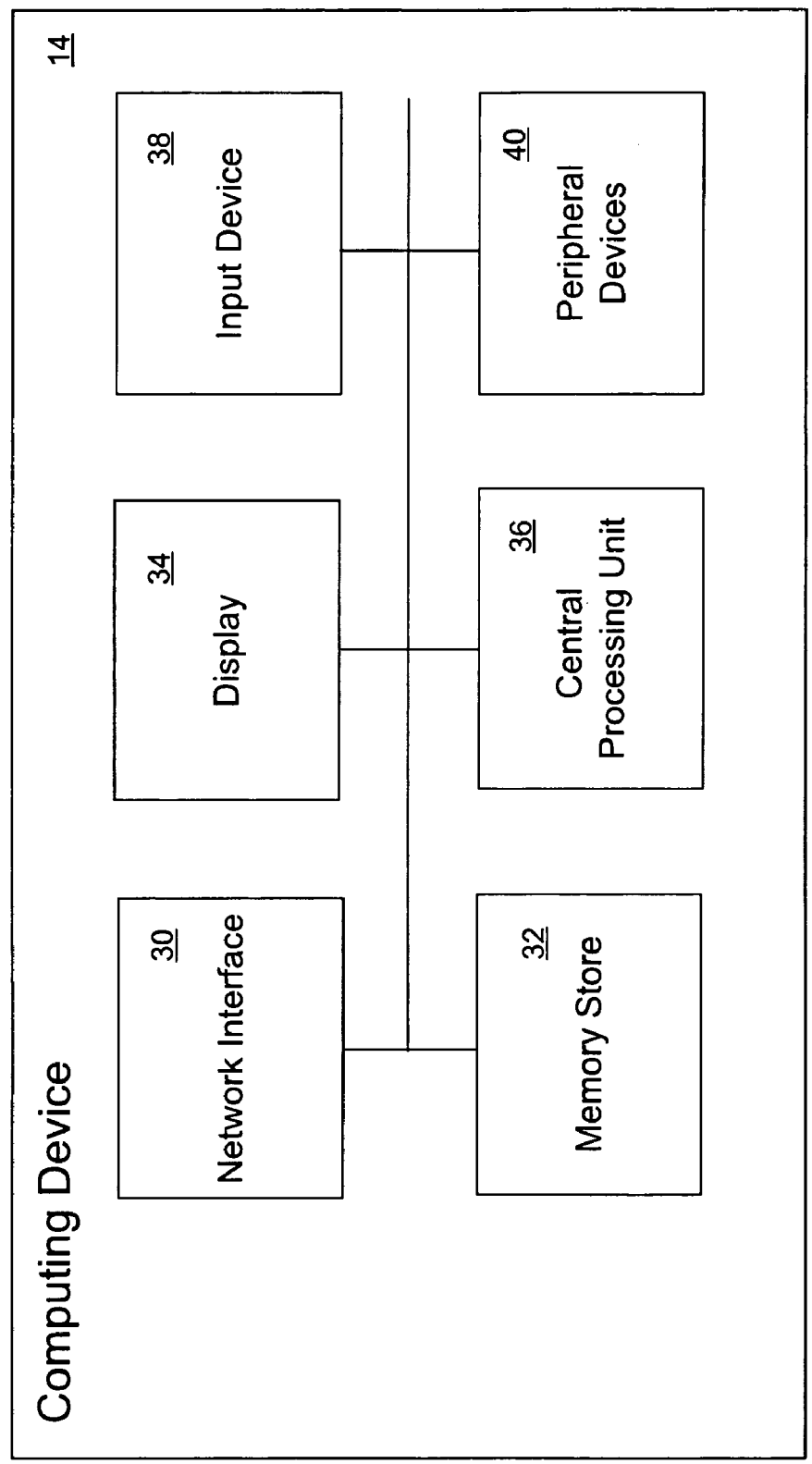
FIG. 2 is a block diagram of the components of a computing device according to an embodiment of the present invention.

Reference is now made to FIG. 2, where in an exemplary embodiment, the components of a computing device 14 are illustrated. The computing device has associated with it, in an exemplary embodiment, a network interface 30, a memory store 32, a display 34, a central processing unit 36, an input device 38, and peripheral devices 40.

The network interface 30 enables the computing device 14 to communicate over the communication network 18. The network interface 30 may be a conventional network card, such as an Ethernet card, wireless card, or any other means that allows for communication with the communication network 18. The memory store 32 is used to store executable programs and other information, and may include storage media such as conventional disk drives, hard drives, CD ROMS, or any other non volatile memory means. The display 34 displays the search results on a monitor type device or screen. The CPU 36 is used to execute instructions and commands that are loaded from the memory store 32. The input device 38 allows users to enter commands and information into the respective device. Computing devices 14 may have associated with them one or more input devices 38, which may include, but are not limited to, any combinations of keyboards, a pointing device such as a mouse, or other means such as microphones. The peripheral devices 40 may include printers, scanners and any other suitable peripheral components. The description that has been provided here for computing devices has been provided for purposes of example to illustrate the general components that are associated with a computing device. Those skilled in the art will appreciate that computing devices may include numerous other components not described herein or may exclude components described above, and such variations on computing devices are within the scope of the present invention.

Figure 3:
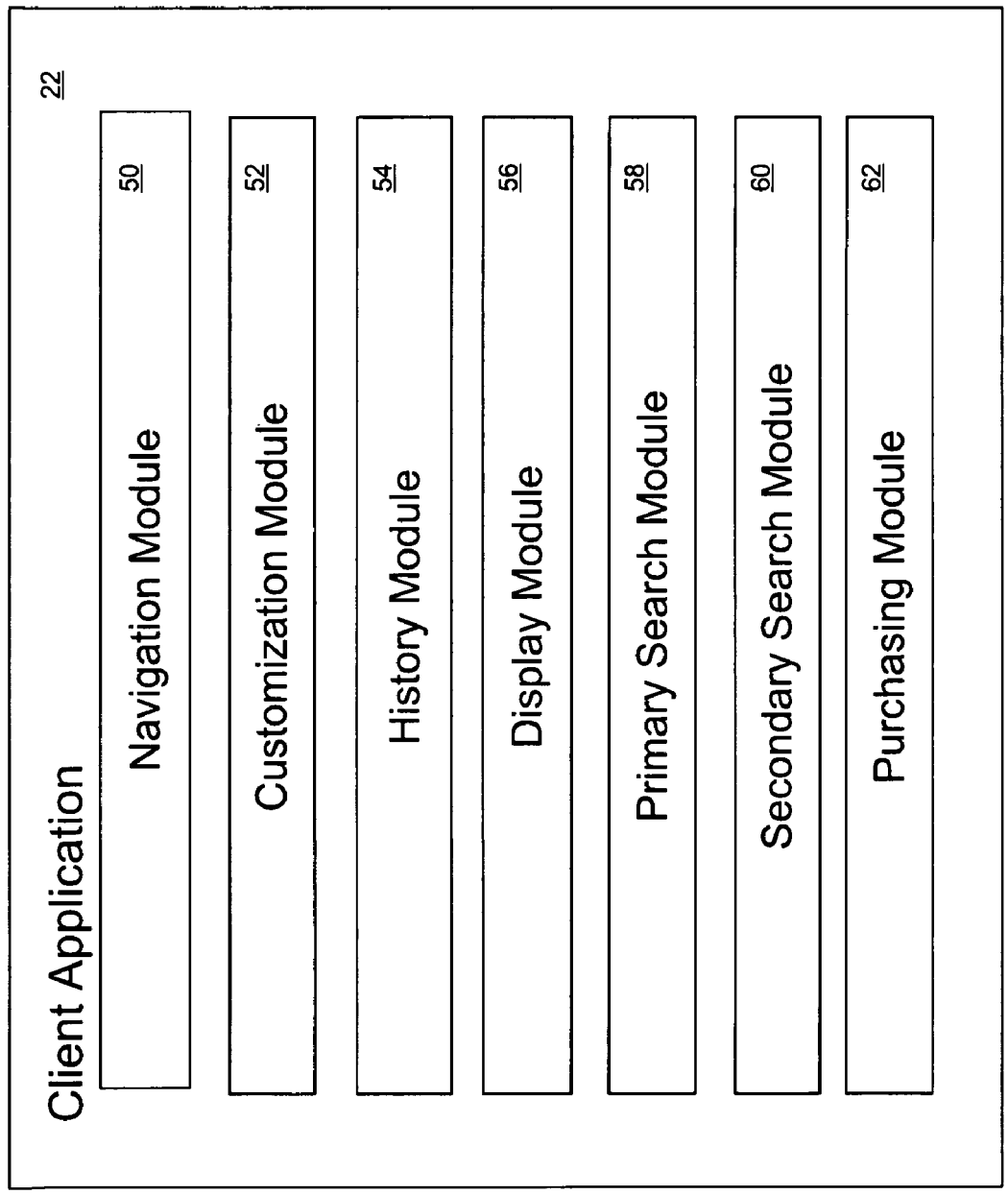
FIG. 3 is a block diagram of the components of a client application according to an embodiment of the present invention.

Reference is now made to FIG. 3, where a diagram illustrating the components of the client application 22 is shown in an exemplary embodiment. In an exemplary embodiment, the client application 22 receives search queries that are submitted by the user, processes the queries according to requested or default algorithms and then displays the search results to the user. The results that are displayed to the user may be further manipulated by the user, and subsequent searches may be conducted through this manipulation as described below. In an exemplary embodiment, the client application 22 has associated with it the following modules: a navigation module 50, a customization module 52, a history module 54, a display module 56, a primary search module 58, a secondary search module 60 and a purchasing module 62. The navigation module 50 provides various tools that allow the user to navigate through the search results that are displayed and for other searches to be conducted as described below. The customization module 52 allows the user to create customized search algorithms that may be saved and used for subsequent search queries. The history module 54, in an exemplary embodiment, provides a summary of a user's session, and is illustrated in further detail in FIG. 12. The display module 56 displays the results upon the screen as described below, in a manner that allows the user to review the respective results with less interactive effort. The primary search module 58 allows a primary search to be conducted by the user through provision of an interface where a user is able to enter a primary search query. The primary search query as illustrated in further detail below may be based on a word, phrase, visual indicator (for example, an image for which similar images are being searched for) or through the provision of a digital asset. A digital asset is reference to an electronic file, and where a digital asset is provided, the content, shape, colour, sound and associated metadata, where appropriate may be the source of the search query. Based on the primary search query that is entered, a search is carried out, and the results are displayed by the display module 56 to the display 34. The secondary search module 60 is used to conduct a secondary search. A secondary search is conducted based on the results of the primary search. Secondary searches may be based on visual data, where visually similar images are searched for, or may be based on metadata. Where searches are based on metadata, files may be searched for appropriate metadata information. The method by which secondary searches are conducted, and the method by which the user can specify the method by which secondary searches are conducted are described in detail below.

A user, by selecting one of the displayed results will automatically, in an exemplary embodiment, cause a secondary search to be conducted where electronic files with similar attributes will be displayed to the user. The algorithm that is executed to conduct the secondary search may be specified by the user, as described below. The display of the secondary search results does not eliminate the display of the primary search results. The user, regardless of the search being conducted always has visible to them the search and navigation functionality as explained below with respect to FIGS. 9 to 11.

The purchase module 62 provides a method by which the user, where appropriate, may purchase any items or products based on the search results that are displayed. As an example, the purchase module 62 may be used to purchase the digital image that that is represented by a displayed search result.

Figure 4:
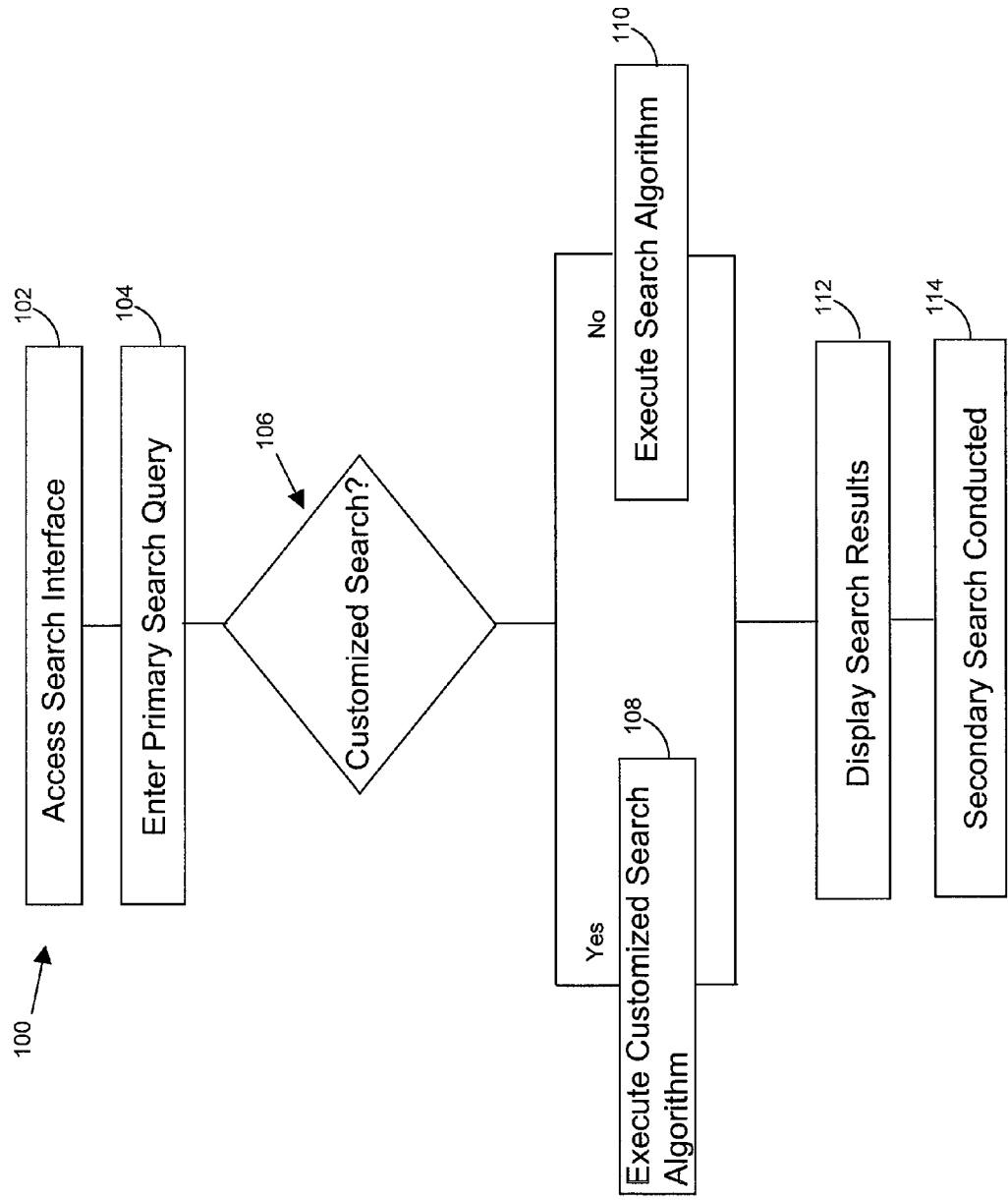
FIG. 4 is a flowchart illustrating the steps of a search method according to an embodiment of the present invention.

Reference is now made to FIG. 4, where a flowchart illustrating the steps of a general search and display method 100 in an exemplary embodiment is shown. The search and display method 100 illustrates the general steps of the method. Various aspects of the general display method 100 are illustrated in the subsequent figures which display various representations of sample screens that may be shown to the user.

Method 100 begins at step 102, where a user wishes to conduct a search and accesses the respective site or interface that allows a search to be conducted. As described above, for purposes of example, the site or interface used to conduct the search may be any site or interface that has associated with it the appropriate search functionality, and may be accessed upon a local dedicated computing device or accessed upon the Internet. Method 100 then proceeds to step 104, where a user chooses to conduct a primary search, by entering a primary search query.

Method 100 then proceeds to decision diamond 106, where a selection is made by the user regarding whether a customized search algorithm should be used. As described below a customized search algorithm may be constructed by the user, where the algorithm performs a set task that yields different results depending on the data set upon which it operates. The customized search algorithm may be used with regards to any search query that is entered by the user as specified below. If it is determined at decision diamond 106, that the user wishes to implement the customized search algorithm, method 100 proceeds to step 108.

At step 108, the customized search algorithm is executed. The customized search algorithm is described in further detail below, but represents an algorithm that is executed based on user specified parameters, as explained below. If it is determined at decision diamond 106, that the user has not requested the customized search algorithm, method 100 then proceeds to step 110. At step 110, a non-customized or default search algorithm is executed. After the execution of step 108 or 110, method 100 then proceeds to step 112. At step 112, the search results are displayed to the user.

Method 100 then proceeds to step 114, where the user is able to conduct a secondary search through engaging with the displayed search results. Based on the displayed results of the secondary search, the user is able to repeatedly perform further secondary searches. The algorithms that are applied at each instance of requesting a further secondary search may also be customized, as described below. For example, where a primary search is conducted, through user specified instructions a secondary search based on a first algorithm may be executed. Based on the results of the secondary search, a further secondary search may be executed, based on a second algorithm specified by the user. Multiple secondary searches may be conducted, based upon the same or different customized algorithms that are used to perform subsequent searches. Further details regarding the algorithms used in the secondary searches are described in detail below.

The steps and any methods employed at the steps of method 100 are described in further detail with regards to the following figures, where the search and display functionality are illustrated with the following sample representative images.

The search layout and functionality as described in further detail below provides for a user-friendly search environment, where users are able to access information in the form of displayed search results, with minimal action on the part of the user. Through the search and display functionality that is described below, a user is able to conduct searches and receive search results that are displayed in a manner that is more intuitive with regards to a user's ability to view and interact further with the search results. Further, the search results that are displayed to the user, allow the user to interact with the search results and conduct secondary searches, without losing their place in regards to reviewing primary search results.

Figure 5:
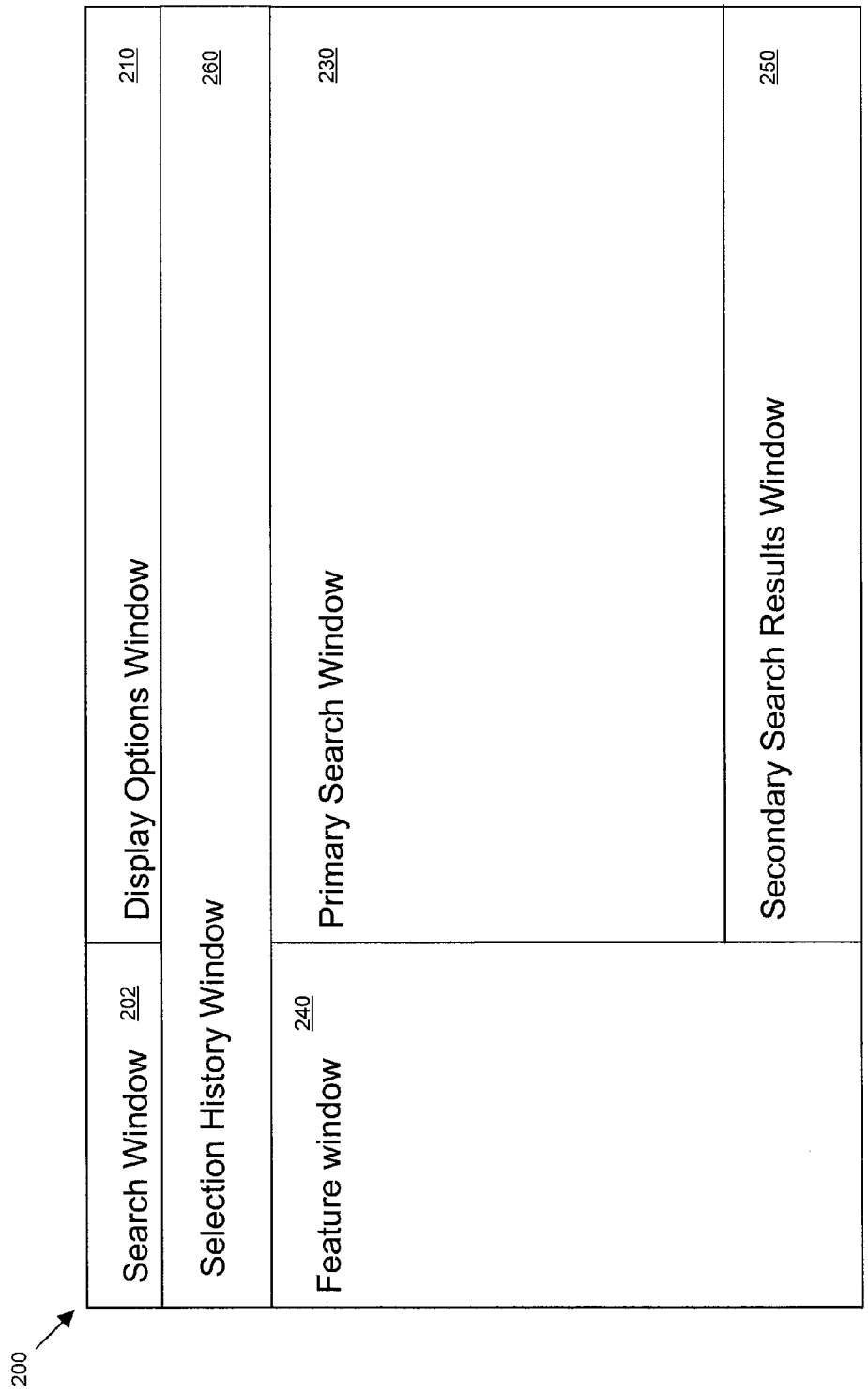
FIG. 5 is a sample illustration of a search and display window according to an embodiment of the present invention.

Reference is now made to FIG. 5, where a diagram illustrating a search and display window 200 in an exemplary embodiment is shown. The search and display window 200 in an exemplary embodiment illustrates the general layout of a search and display screen that is used to conduct searches, display search results and further interact with those search results. The term window is used to describe the respective screens and interfaces that might be used with the system 10. Various embodiments of the search and display window 200 will be shown to better illustrate the functionality that is described in further detail below.

The search and display window 200 may be displayed upon the display screen of any computing device 14 or mobile device 16 that is used to interact with the document server 20. In an exemplary embodiment, the search and display window 200 is divided up into a search window 202, a display options window 210, a primary search results window 230, a feature window 240, a selection history window 260 and a secondary search results window 250.

Figure 6:
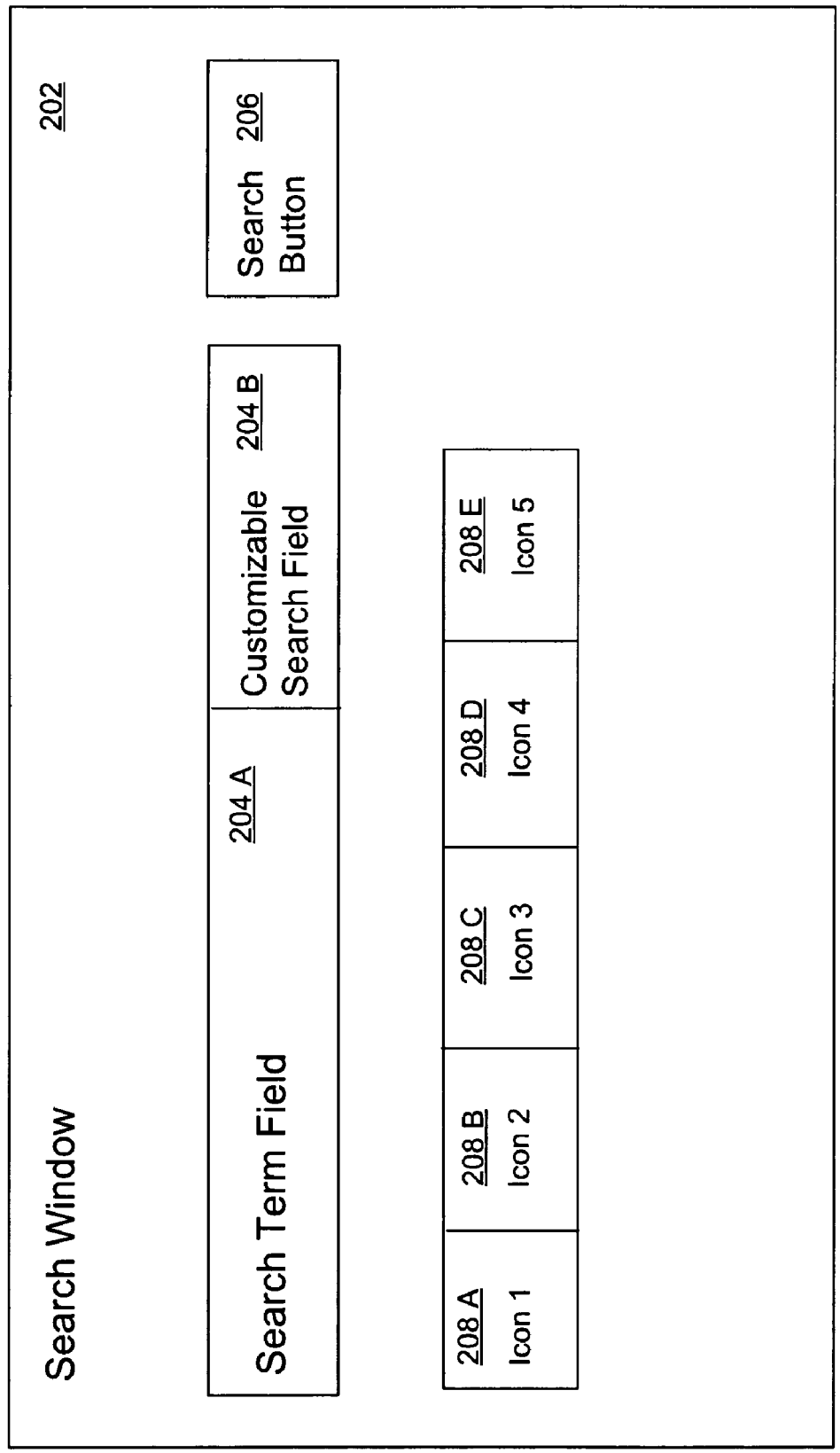
FIG. 6 is a sample illustration of the search window component of the search and display window.
Figure 7:
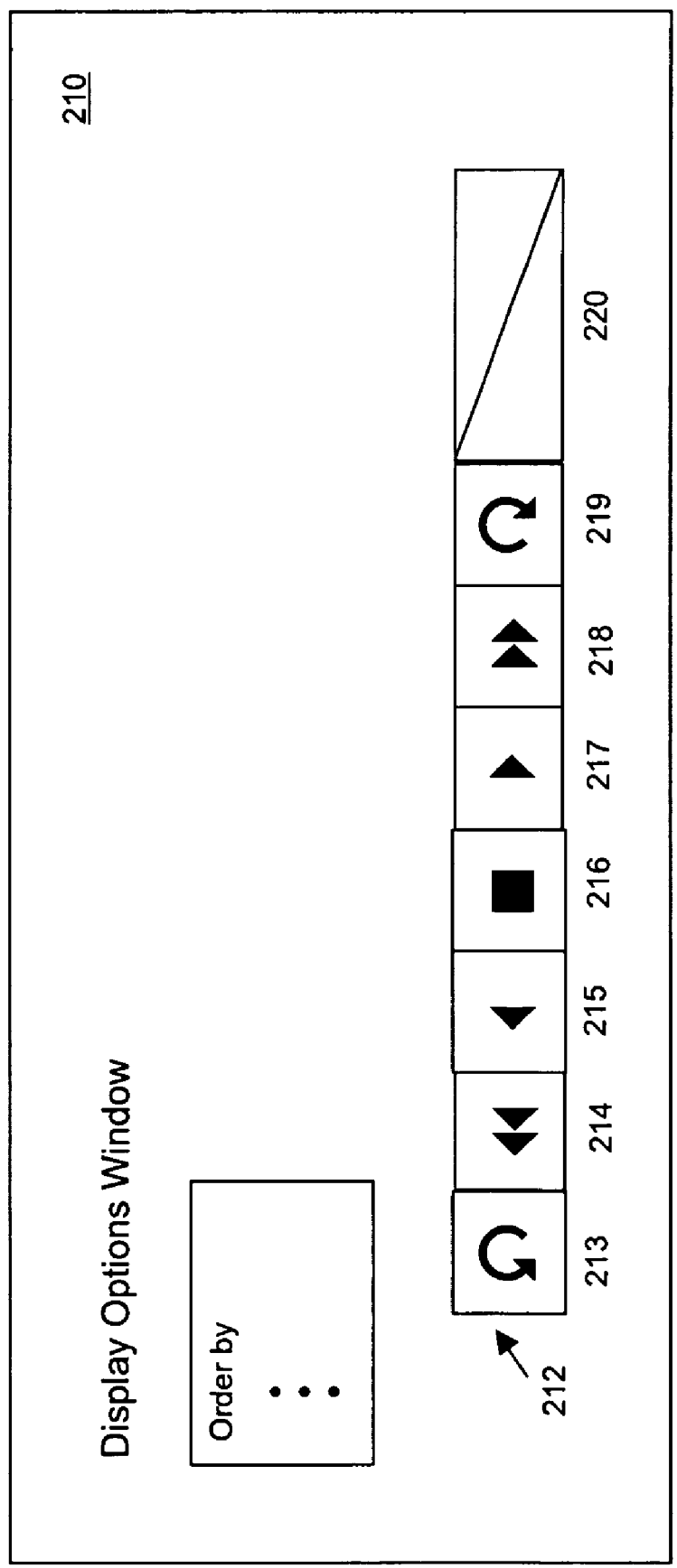
FIG. 7 is a sample illustration of the display options window component of the search and display window.

The search window 202 allows the user to enter search queries that are then executed and the resultant search results are displayed in the primary search results window 230. The display options window 210 provides options to the user by which they may customize the display of search results. The functionality provided in the search window 202 and the display options window 210 as illustrated with reference to FIGS. 6 and 7 are always visible to the user in an exemplary embodiment. The display options window 210, in an exemplary embodiment provides the user with options regarding the display of their respective search results and their interaction with the displayed search results. The primary search results window 230 displays the primary search results. The feature window 240 provides an area for one instance of a search result to be highlighted and for further detailed information (metadata) to be provided regarding the specific search result. The selection history window 260 is used to display a representation of previously selected results. The secondary search results window 250 is used to display results from secondary searches that are carried out. Secondary searches are carried out, in an exemplary embodiment, based on the interaction with at least one of the search results that are displayed in the primary search results window 230. The layout of the search and display window 200, including the respective areas mentioned above, may be positioned and sized differently in alternative embodiments.

Figure 8:
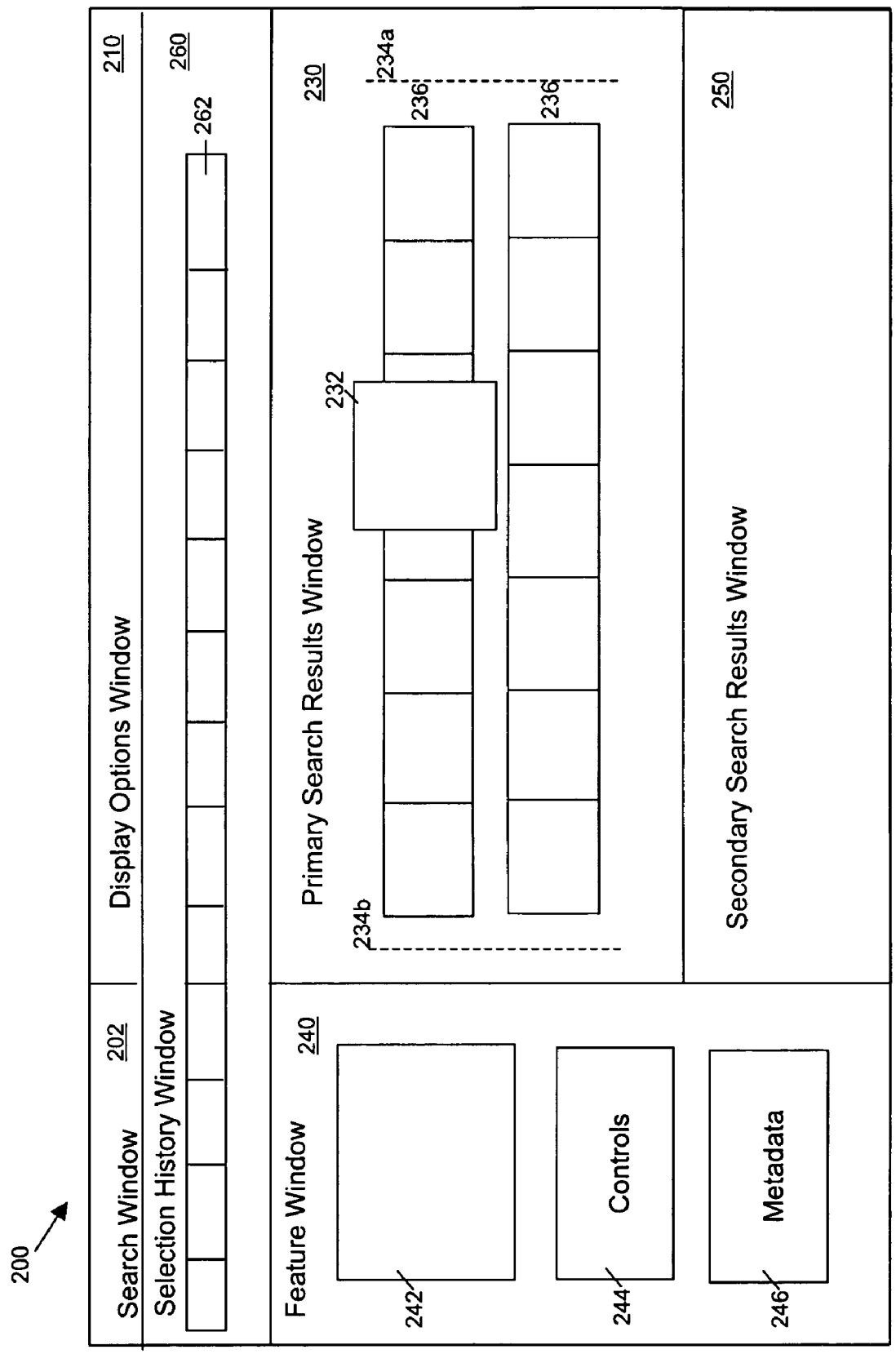
FIG. 8 is a sample illustration of the components of a primary search results window and the feature window of the search and display window.

Reference is now made to FIGS. 6 to 8, which, in an exemplary embodiment, illustrate in more detail the respective features of the search and display window 200. Specifically, reference is made to FIG. 6, where a diagram illustrating the features of the search window 202 is illustrated in an exemplary embodiment.

The search window 202, in an exemplary embodiment, has a search term field 204A, a customized search field 204B, a search button 206, and one or more customizable search buttons 208A, B, C, D and E. The search term field 204A is used to enter search terms that form part of a primary search query. Alternatively, the search term field 204A may be used to upload files that are used to conduct searches based on the ability to identify similar content in other files. Technology that is used to extract attributes regarding content of files is known, and such technology may be provided through use of products such as, but not limited to, IDEE Inc.'s Epsion™ product, LTU Technologies Image Seeker™ product, and Bollide Software's Image Comparer™ product. The customized search field 204A may be used in connection with particular types of secondary searches, such as the paring method described below. The customized search buttons 208A, B, C, D, and E allow for the user to customize search queries, with respect to how the search is to be conducted and how the search results are to be displayed. The user may create a customized search by choosing from one or more options presented related to the method of conducting the search to the method of displaying the search results. The customized search allows a user to save their respective search preferences, and execute the same search in the future.

Reference is now made to FIG. 7, where a diagram illustrating the features of the display options window 210 in an exemplary embodiment is shown. The display options window 210 in an exemplary embodiment, allows the user to select options regarding the display of the search results in the primary search results window 230. The method by which search results are displayed are further illustrated with respect to an exemplary embodiment of the various options that are available to the user to customize the display of search results.

The display options task bar 212, allows the user to select from various options with regards to the display of search results. In an exemplary embodiment the display options task bar 212 has the following features: a reverse button 213, a fast rewind button 214, a slow rewind button 215, a stop/pause button 216, a play button 217, a slow forward button 218, a fast forward button 219, and a status indicator window 220.

The size of the displayed search results is based on a combination of various factors in an exemplary embodiment. The size of the initial display of the search results is based on the number of search results that are found in a search. The screen size and resolution of the user's monitor are also analyzed to determine the size of the primary and secondary search results that are displayed. Also, depending on the user's preferences, images of various sizes may be displayed.

The operation of the respective features of the display options task bar 212 and the system 10 in general is described herein with regards to the display of search results upon one or more screens. The display of a screen refers to all of the search results that are displayed upon the primary search results window 230. When it is indicated that a subsequent screen is displayed, this refers to replacing the displayed search results and advancing or reversing one full screen with other displayed search results. The reverse button 213 when engaged causes the screen to playback the previous screen of search results that were displayed. Both the slow rewind button 215 and the fast rewind button 214 cause the displayed set of images to be replayed in a continuous format. The fast rewind button 214 causes the displayed set of images to be replayed at a faster rate than the slow rewind button 215. The speeds of all the various modes of playback that are described herein may be customized by the user. The stop/pause button 216 causes the continuous display of the search results to be stopped. The play button 217 causes the display to proceed to display the respective search results. Each screen of search results is displayed for a predetermined period of time. The user is able to view all of the search results continuously without performing any actions after engaging the play button 217. The slow forward button 218 causes the display of the search results to be forwarded and the fast forward button 219 causes the display search results to be displayed at an increased rate. The status indicator window 220 provides an indication as to the percentage of search results for a specific search that have been displayed to the user. The status indicator window 220 in an exemplary embodiment may be engaged by the user to forward or reverse the display of search results to a position (based on the percentage indicator of the status indicator window 220) that is suitable to the user. The status indicator window 220 may also indicate ranges of search results that the user would like to scroll through. For example, the user may indicate that they wish to view results 20-40 of the 600 search results that have been found.

Referring now to FIG. 8, the primary search results window 230 displays the primary search results that have been found based upon the primary search query. The primary search results are displayed in multiple rows and columns where appropriate. In an exemplary embodiment, the primary search results are displayed left to right. To see the next set of search results the search results are scrolled from left to right. In alternative embodiments the displayed search results may be displayed in a manner where they may be viewed from top to bottom, or from right to left, or from bottom to top.

In an exemplary embodiment, the primary search results window 230 is shown with two rows 236. However it should be understood that the primary search results window 230 may have one or more rows 236, where, with an increased number of rows, the information and detail that is provided to the user through the each search result that is displayed may be reduced. Search results that are displayed are representations of the actual electronic file that has been located. The search result that is displayed may be an actual representation of a file (referred to as a thumbnail), if the file database is being used to search images, or may be a text description of specific attributes or content that may be associated with the file, or any combination of the two. Where the search results require more than one screen to display in an exemplary embodiment, the search results may be displayed by scrolling the row in a left to right manner.

The user, in an exemplary embodiment may use a pointing device to highlight a search result. In an exemplary embodiment, one of the displayed search results is highlighted when the pointing device is held over the search result, as shown in FIG. 8 by the enlarged thumbnail 232. Alternatively, the search result may be highlighted where the search result is clicked on through either a single or double click. When the search result is highlighted, the resultant image is displayed in the feature window 240 and more specifically in the feature window display 242. When the resultant image is displayed in the feature window 240, information regarding the resultant search result is displayed in the feature window information display 246. The feature window information display 246 is used to display information regarding the search results, such as metadata. The feature control window 244 provides the user with various controls regarding the search result displayed in the feature window 240.

As has been illustrated, the primary search results may be displayed in multiple rows and columns. Each row and column that is used to display search results may have customized display properties associated with it.

The secondary search results window 250 displays search results after a user has conducted a secondary search. In one embodiment, the user conducts a secondary search by engaging with one of the displayed search results (thumbnails) of the primary search result. For example, by clicking on one of the displayed search results, a default or customized secondary search algorithm is executed. Where the electronic files are image files, the default secondary search algorithm may search for visually similar image files when the secondary search has been requested. The method of performing the search for visually similar images are known through use of products such as those described above. The method results in similar digital images being displayed to the user in the secondary search results window 250. Alternative secondary search criteria may also be specified by the user as described in detail below.

Reference is again made to FIG. 8 to better illustrative the respective modes of navigation associated with the search results windows. In this embodiment, the user may view the search results in multiple modes. The modes of viewing and interacting with the search results include, but not limited to, a scroll mode, a browse mode, an auto browse mode, and smart advance mode. The modes may be engaged through use of the display options task bar 212 (shown in FIG. 7) in one embodiment. When the user chooses to scroll through the various images, the various search results are displayed to the user at a continuous speed that is specified by the user.

In the browsing mode, when the user engages the primary search results window 230 through a single click, an advance or reverse of one full screen is made for the display of the search results. In the auto browse mode, the screens will advance or reverse for one full screen and then pause for a predetermined amount of time. The user may chose to highlight a search result by placing their pointing device over the displayed result. Where the result is highlighted in the auto browse mode, an enlarged representation of the search result may be displayed in the feature window 240. This allows for the screens to automatically advance or reverse.

In the smart advance mode, where the displayed search results are in the stop state, when the user places their pointing device or mouse arrow close to one of the edges 234a or 234b of a primary search results window 230, the rows 236 of the primary search results window 230 automatically advance. If the mouse or pointing device is on the right edge 234a of the primary search results window 230, then the rows 236 of the primary search results window 230 automatically proceed to advance one screen to the right. If the pointing device is placed on the left edge 234b then the rows 236 of the primary search results window 230 automatically proceed one screen to the left. The user may also be able to manipulate any of the rows 236 displaying the search results by dragging the columns forward or backward.

As discussed above, the user may manipulate a displayed search result by highlighting the search result through clicking on the search result or scrolling over the search result. Each time a search result from the primary search results window 230 is selected, the search result may also appear in the selection history window 260. The selection history window 260 may display all the previously selected search results in one or more rows 262. This may allow a user to see all the search results which have been selected during the session and return to any of these search results at any time by highlighting a search result in the selection history window 260. When the one or more rows 262 have been filled, the rows may be resized to accommodate more search results or the previously selected search results may be navigated using one or more of the methods described above. Alternatively, the selection history window 260 may only keep track of a specific number of the most recently selected search results.

Figure 9:
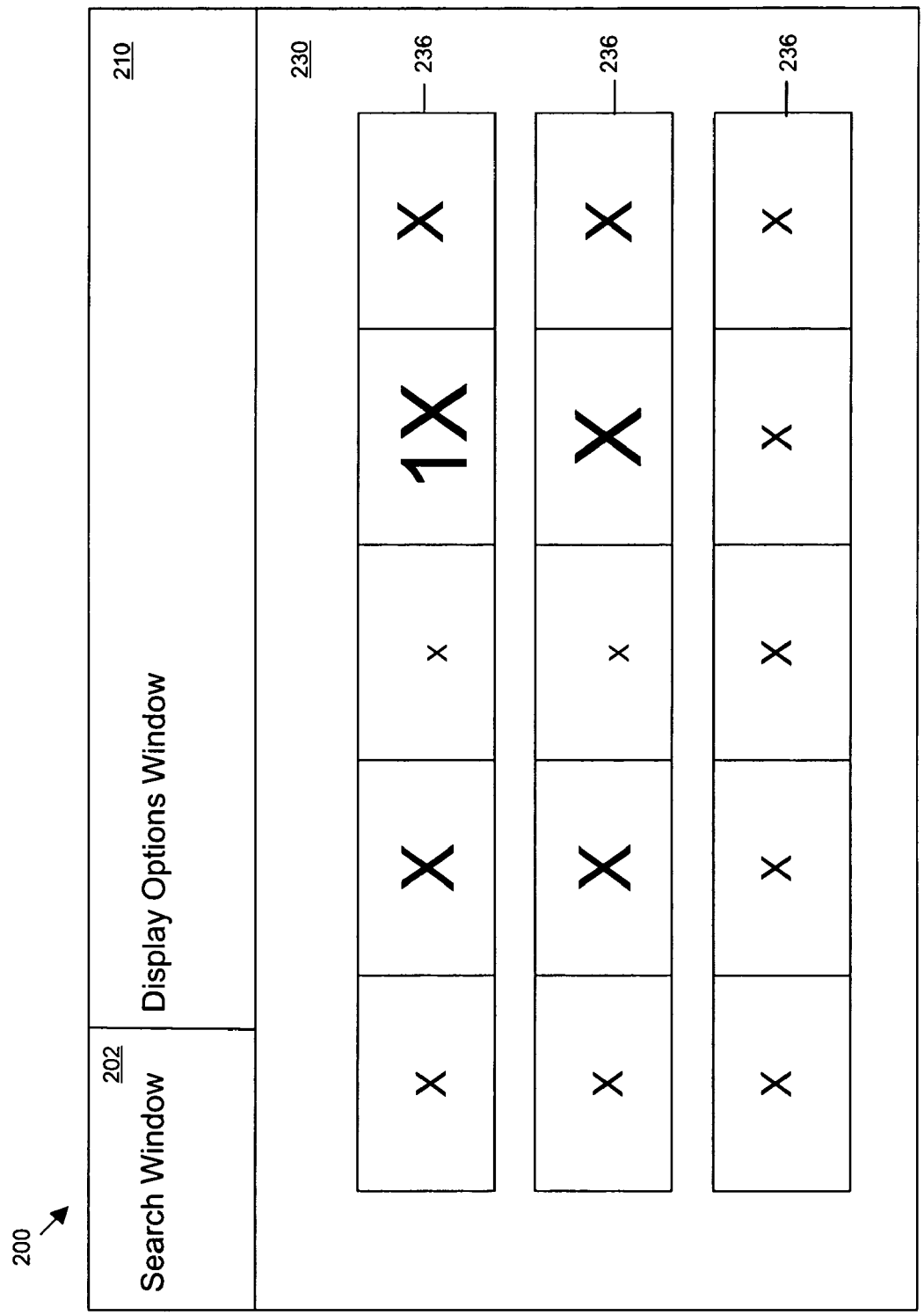
FIG. 9 is a sample illustration of the primary search window component of the search and display window.
Figure 10:
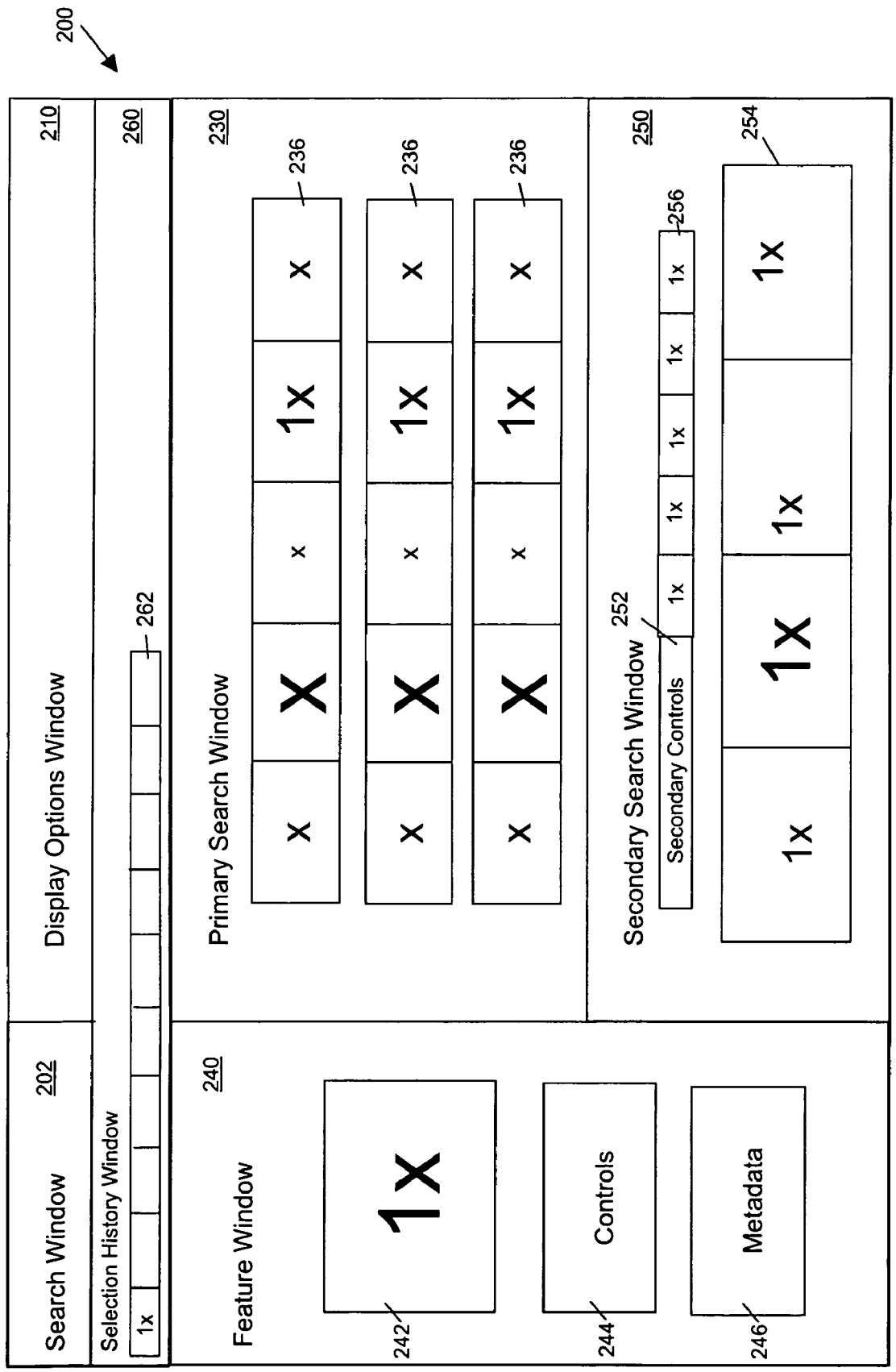
FIG. 10 is a sample illustration of the primary search results window, the feature window, the selection history window and the secondary search results window component of the search and display window.
Figure 11:
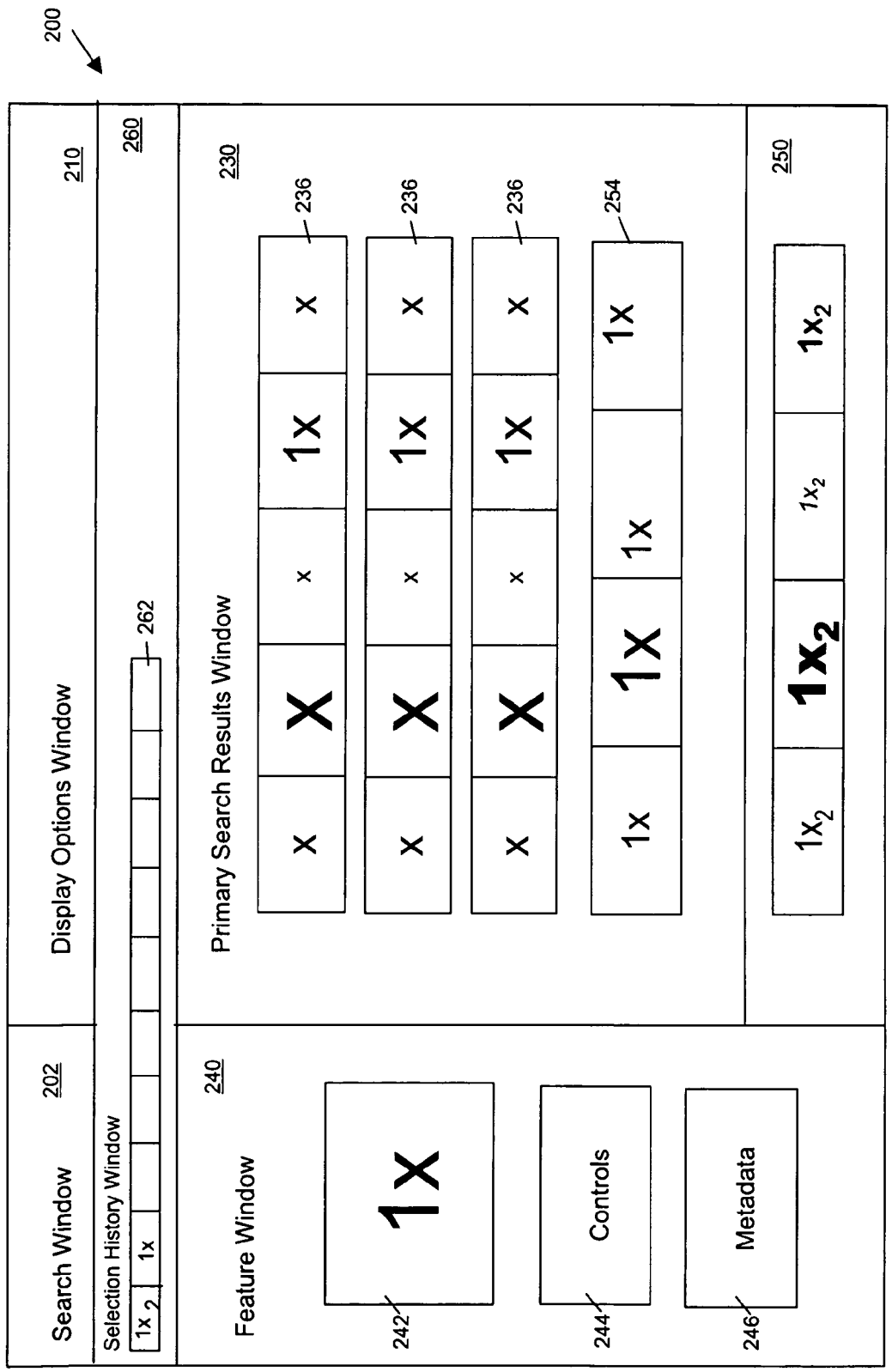
FIG. 11 is another sample illustration of the primary search results window, the feature window, the selection history window and the secondary search results window component of the search and display window.

Reference is now made to FIG. 9-11, where a diagram illustrating the interaction that is undertaken where the user conducts a search and the search results are displayed in the search and display window 200 is shown. As illustrated with reference to FIGS. 9-11, the search and display window 200 may have different configurations with respect to the size and location of the respective sub-windows associated with the search and display window. FIG. 9 shows an alternative embodiment where there is no feature window 240 and secondary search results window 250. In this embodiment, the feature window 240 and the secondary search results window 250 appear only after the user has performed an action on one of the search results displayed in the primary search results window 230. The user may select any of the displayed search results or thumbnails for further reference through the methods that have been described above.

Reference is now made to FIG. 10, where a search and display window 200 is shown after the user has interacted with one of the displayed search results or thumbnails. When the user has selected one of the search results, an enlarged version of the search result is displayed in the feature window 240. The feature window 240 also displays information or metadata regarding the image. In this exemplary embodiment, selecting a search result from the primary search results window 230 also causes the selected search result to appear in the selection history window 260.

As further illustrated with reference to FIG. 10, upon selecting one of the primary search results, the secondary search results window 250 is opened. The secondary search results window 250 displays search results from the database 24. The secondary search results are displayed in one or more secondary search row 254. Upon the display of secondary search results, the primary search results are still visible in a reduced portion of the screen. The user has not lost his/her place with respect to the review of the primary search results, as the secondary search results are not displayed on a new screen that deletes the primary search results. The user is now able to interact with either the search results displayed in the primary search results window 230 or in the secondary search results window 250.

Where the user interacts with a secondary search result, a subsequent secondary search is carried out similar to the search that is conducted when a primary search result is interacted with. In this exemplary embodiment, the results of this subsequent secondary search will be displayed in secondary search row 254.

The secondary search results window 250 may also include a preview secondary results display 256. This would allow a user to preview the secondary results which would be displayed in secondary search row 254 if a particular search result were selected. This allows a user to view the results which would result from a secondary search without losing the current secondary search results in secondary search row 254. For example, a user may be able to preview the secondary results for a particular search result in the preview secondary results display 256 by holding the pointing device over the particular search result. The user could then, if desired, conduct the secondary search by clicking on the particular search result.

The secondary search results window 250 may include secondary controls 252 similar to the display options task bar 212 in the display options window 210 discussed with reference to FIG. 7. The secondary controls 252 may allow the user to select from various options with regards to the display of search results in the secondary search results window 250.

Reference is now made to FIG. 11, where an alternate embodiment of the search and display window 200 is shown after a thumbnail from the secondary search results is manipulated. In this embodiment, where one of the secondary search results is manipulated, the currently displayed set of secondary search results are then displayed in the primary search results window 230 in row 254, and a new set of secondary search results are displayed in the secondary search results window 250. By not deleting the previous set of secondary search results, the system 10 allows the user to keep track of all of the steps they have performed, eliminating the need to make use of the conventional back button. Similarly, if the user manipulates another secondary search result, the secondary search results are again displayed as part of the primary search results window 230. When such displays are merged, the thumbnails are resized to accommodate the additional thumbnails that are displayed in the primary search results window 230. Each time a search result is manipulated, it will be added to the selection history window 260.

Figure 12:
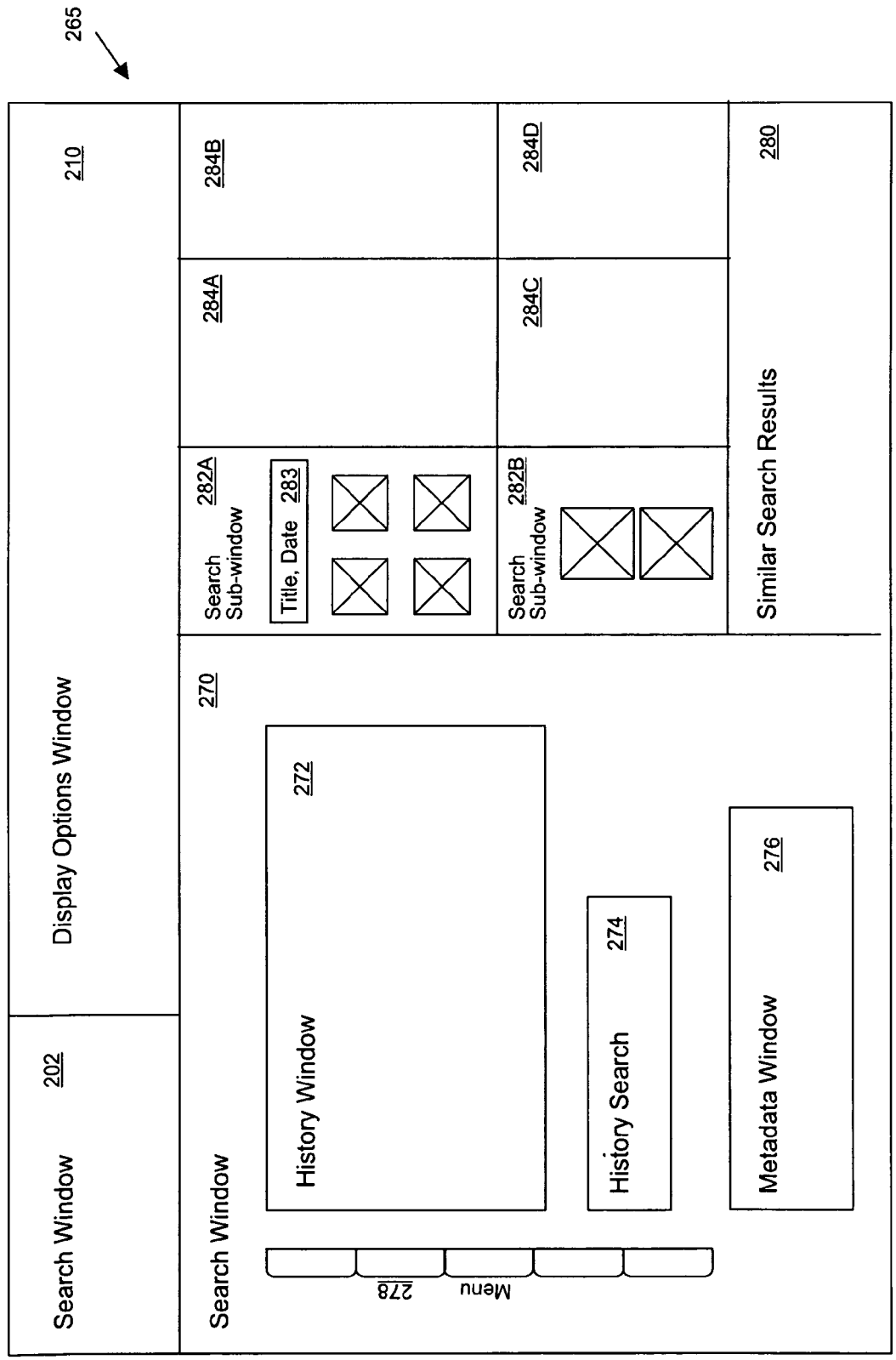
FIG. 12 is a sample illustration of a history window.

Reference is now made to FIG. 12 where a sample search history window 265 is shown. The search history window 265 allows the user to review primary searches that they have conducted, the search results that have been displayed and the secondary searches that have been conducted based on the displayed results. The search history window 265 comprises a search window 202 and display options window 210 as described above.

The search history window 265 further comprises a second search window 270 that displays detailed information regarding one of the displayed search results that have previously been shown to the user. The search window 270 further comprises a history window 272, a history search field 274, a metadata window 276 and a menu tab 278. The history window 272 displays a search result in a larger thumbnail image. The menu tab 278 provides the user with menu options that allow the user to select from a variety of options with regards to the display of the search results.

The menu tab 278 provides the following options in an exemplary embodiment: a history option, an upload option, a matching color option, an autopairing option, a keywords option, a tags option, a categories option, a zoom option, and a price option. The history option provides a graphical representation of the user's current search session, including the user's search terms. The upload option allows users to upload images or other electronic files. These files may be used to perform visual similarity or other searches. The color option allows the user to modify color characteristics in a visual image, and to use that modified visual image as the source for further searches, as described below. The autopairing option allows the user to apply further keyword searching to search results, as described in further detail below. The keywords option displays the keywords that are associated with an electronic file. The user may then select and click on one of the keywords, and a search is conducted based on these keywords. Additionally, the various keywords that were used by previous users to display the specific search result may also be shown. The categories tab provides information relating to the general category that the electronic file belongs to. The zoom option allows the user to zoom in on a portion of the image. The price option may display a price associated with the purchase of the electronic file.

The history search field 274 allows the user to view the history of their current session. In an exemplary embodiment, the history of the user's current session may include information relating to the time and date of the session, the keywords that have been used, the images that were interacted with, and information regarding secondary searches that were conducted. The metadata window 276 provides detailed metadata information regarding the displayed search results.

The search sub-windows 282A and 282B have been shown for purposes of example. The search sub-windows display to the user a history of other searches that the user has conducted in their previous sessions. The time and date of the search along with a keyword that is used to identify the search are provided. Thumbnails are also included in the search sub-window representing search results that have been interacted with. The search sub-windows 282A and 282B may also include further information about the search 283 such as a title of the search and the date it was conducted. Additional windows 284A to 284D can be used as further search sub-windows. The similar search results window 280 can display search results which are similar to a selected search result.

The search functionality that is the subject of the present application may be based on a variety of search types that depend on the subject matter. Where images are used in the system 10, the system 10 may perform visual similarity searches, that determine visual similarities based upon user specified preferences. Visual searches may be conducted through the incorporation of known visual search engines, such as IDEE Corporation's Epsion™ package, or through use of other similar packages as described above.

Where the subject matter is not visual images, and the electronic files are text based, text based searches may be conducted by the system 10. Text based searches that are conducted are described in detail below. Additionally, for both image and non image files, searches, both primary and secondary, may be conducted based one or parameters associated with the electronic file. Additional parameters include, but are not limited to, the author of the file, date of creation, size of the file, price (if applicable), popularity based on views or purchases, or ratings.

Additional specified parameters may also be included where users may specify parameters related to images that users from similar locations (in terms of geography) have searched for. For example, through a user's IP address, where applicable, the system 10 is able to track the respective locations of the users. A user may request a primary or secondary search based on the search preferences of users in their geographic locality or other geographic locality. Also, a user may request a search based on categories that represent the respective files.

Users may also be provided with the option of customizing their secondary searches through specifying the parameters that are to be searched for. Users may be provided with an interface, wherein they may specify the parameters associated with a visual search. With image files, the user may specify that a secondary search is to look for visually similar images. With non image files (such as text files), the user may specify that the secondary searches should look for textual similarities in other documents. Textual similarities may be taken from various parts of a document as specified by the user (i.e., the title). The user may also specify parameter based searches as described above.

Figure 13:
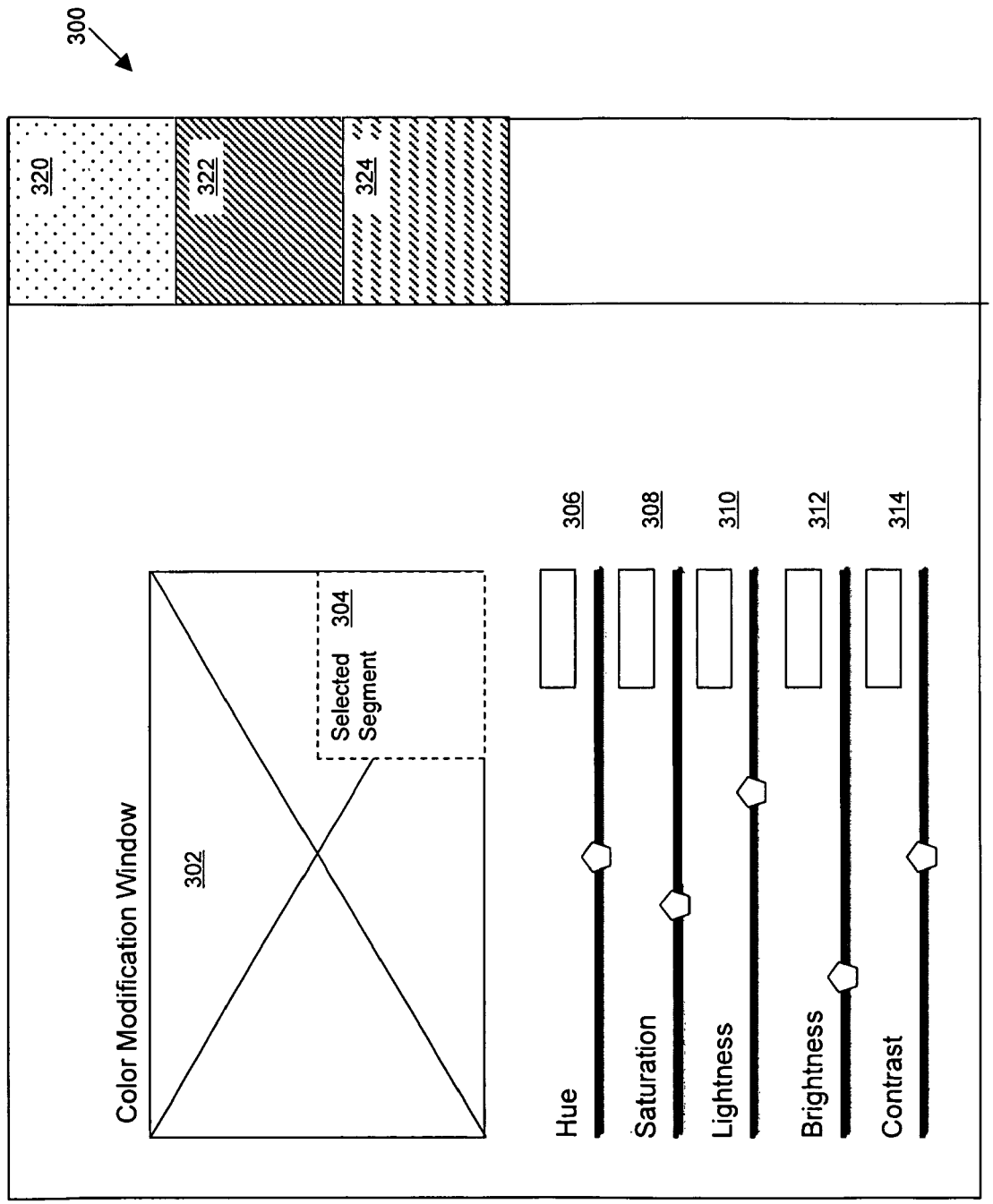
FIG. 13 a sample illustration of a visual search window.
Figure 14:
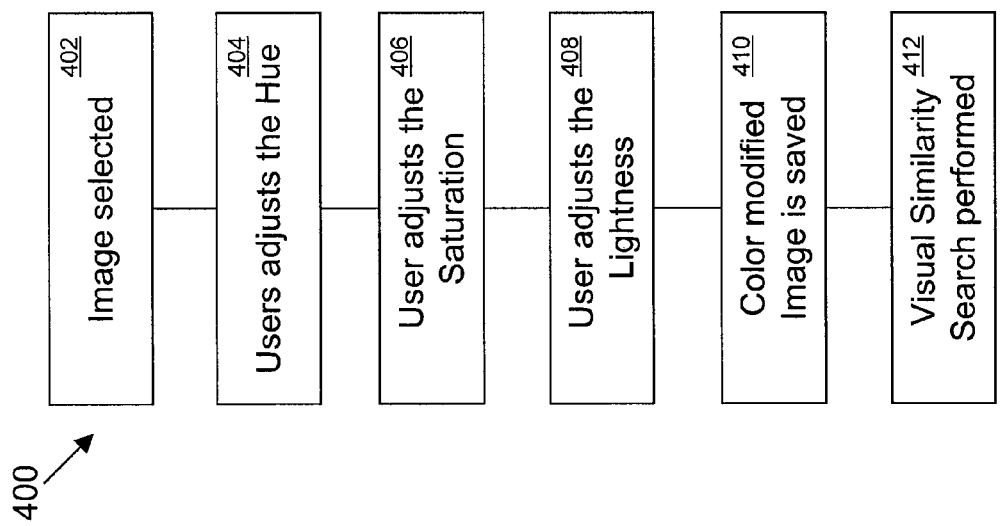
FIG. 14 a flowchart illustrating the steps of a color customization method according to an embodiment of the present invention.
Figure 15:
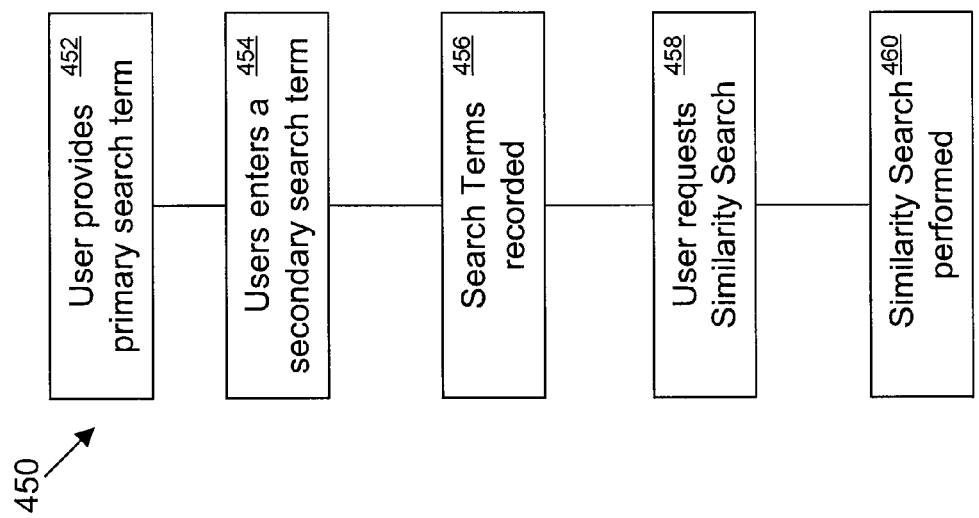
FIG. 15 is a flowchart illustrating the steps of a pairing method according to an embodiment of the present invention.

Additional search functionality may also be provided that allows the user to conduct further customized visual searches. Reference is now made to FIGS. 13 to 15 where more information is provided regarding detailed methods of conducting additional customized primary and secondary searches.

Reference is now made to FIG. 13, where a diagram of a customized visual search window 300 is shown in an exemplary embodiment. The customized visual search window 300 is shown for purposes of example, and may be used to conduct customized visual searches as described herein. The customized visual searches that may be conducted include, segment based searches and color-modified searches. The steps of a color modified search method are described in further detail in FIG. 14.

A color modified search allows a user to select a displayed search result image or a segment of the image 304, modify color information regarding the image and perform a search based on the modified color image. The image, or selected segment of the image 304, may be modified based on one or more characteristics. The respective characteristics that may be modified include the hue level 306, the saturation level 308, the lightness level 310, the brightness level 312, and the contrast level 314. In alternative embodiments, the user may also be provided with the tools to delete portions of an image, or modify an image, and to then perform secondary searches. Upon modifying one or more characteristics of the respective image, a search is conducted for visually similar images as described in further detail with regards to FIG. 14.

The customized visual search window 300, displays the customized images 320, 322 and 324 based on the user's specified customizations. Three customized images have been shown for purposes of example, however one or more customized images may be shown. The image that is selected for further customized searching is displayed in color modification window 302.

The user is also provided with functionality that allows the user to select segments of an image for color modification or for further searching. More specifically, where the user selects an segment of an image, the user may then perform color modifications on that selected segment 304, or the user may use that selected segment 304 to conduct a visual similarity search without any further modifications.

Reference is now made to FIG. 14, where a flowchart illustrating the steps of a color customization method 400 is shown in an exemplary embodiment. The color customization method 400 begins at step 402, where an image is first selected by the user. The image that is selected may be selected from the displayed primary or secondary search results. At step 402, the user may chose the entire image to apply the appropriate colour modifications to. Method 400 then proceeds to step 404, where the user may adjust the hue setting. As illustrated in FIG. 13, the user may adjust the respective settings through use of a slide bar or through entering a percentage representing the hue factor. Method 400 then proceeds to step 406, where the user adjusts the respective saturation levels, and to step 408, where the user adjusts the respective light levels. Though not shown in method 400, the user may also adjust the brightness and contrast levels associated with the image. The respective adjustments that may be performed need not be performed in combination. The user may adjust any combination of the levels to arrive at a color modified image. Once the respective color modifications have been made, method 400 proceeds to step 410. At step 410, the color modified image is saved so that it may be used to perform visual similarity searches. The respective color modifications that have been made may also be saved independently. This color profile (based on the specified value for the respective components) may be used to modify the color components of images in the same manner for further searches.

Where the user has selected a portion or segment of an image 304, the user may use that segment to conduct a visual similarity search at step 412. The user may zoom in on any segment 304 of the image that they wish to use to conduct more detailed searching with. Where the user zooms in on a portion of the image, the enlarged segment of the image fills the color modification window 302. The user may then chose to save this enlarged segment of the image to conduct a visual similarity search and the selected magnified segment of the image is then saved as a new image for searching purposes.

Reference is now made to FIG. 15, where the steps of a pairing method 450 are shown in an exemplary embodiment. The pairing method can be used as a type of secondary search which is triggered when a search term is included in the customizable search field 204B and a primary search result is selected. Through the pairing method, users are able to search for matching content in images where there subject of the images is different. For example, where the user has conducted a primary search for images including a woman, the user may then perform a secondary search for images of children that appear similar to one of the images of a women.

Method 450 begins at step 452, where the user provides a primary search term in the search term field 204A. A search is then conducted through use of the search functionality as described above for the primary search term. The results of the primary search will be displayed in the primary search results window 230 as described above.

Method 450 then proceeds to step 454, where the user enters a secondary search term in the customizable search field 204B. The secondary search term is used to conduct a secondary search for images related to the secondary search term which appear similar to a primary search result. At step 456, the search terms are recorded in a temporary data store to be used to conduct detailed searching. At step 458, the user requests a secondary search by selecting one of the primary search results, as described above. At step 460, a similarity search is performed based on the selected primary search result and the secondary search term. These results will be displayed in the secondary search results window 250.

For example, in an exemplary embodiment, the user may enter the primary search term "women" in the primary search field 204A. The visual search engine then performs searches for images of women. These results will be displayed in the primary search results window 230. The user may then enter as a secondary search term, "children" in the customizable search field 204B. When an image of a woman is selected from the primary search window, triggering a secondary search as described above, a similarity search will be performed for images of children which appear similar to the selected image of a woman. These child images will appear in the secondary search results window 250.

As with other types of secondary searches, the primary search results will remain in the primary search results window 230 when a secondary pairing search is conducted. Further pairing searches can then be conducted by selecting other primary search result from the primary search results window 230. Further secondary searches may also be conducted by selecting one of the secondary search results from the secondary search results window 250.

There are at least two possibilities regarding the type of search which may be conducted when a secondary search result is selected after a pairing search has been conducted. First, a standard secondary search may be performed based on one or more attributes of the selected secondary search result. For instance, in the example described above, selecting one of the images of children from the secondary search results window 250 could result in further images of children similar to the selected image being displayed. Alternatively, another pairing search may be conducted when a secondary search result is selected, based on the original search term in the search term field 204A. For instance, in the example described above, selecting one of the images of children from the secondary search results window 250 could result in images of women similar to the selected child to be displayed. This allows the user to continue searching for the most desirable woman/child pair.

Figure 16:
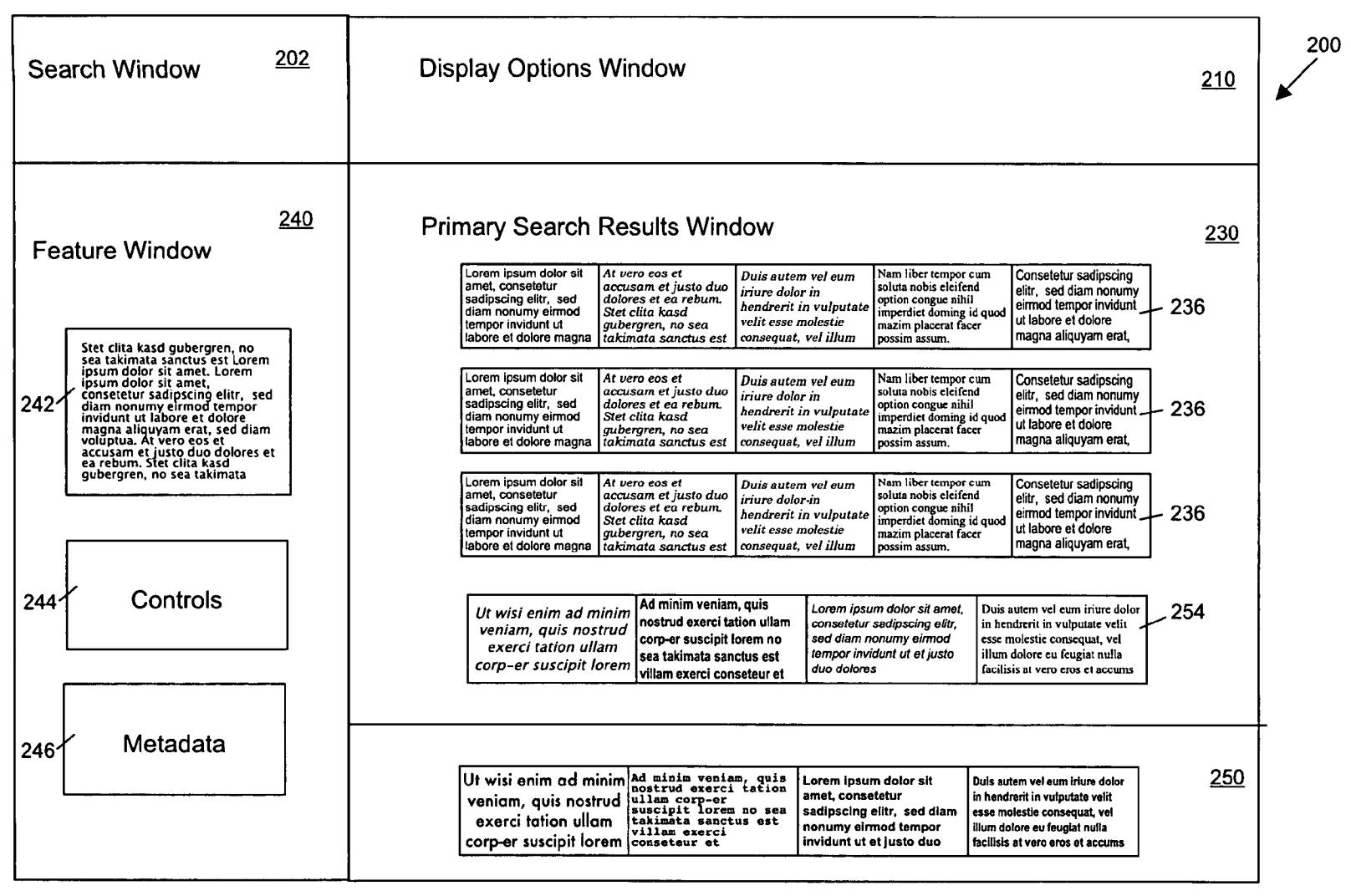

The examples of the search functionalities that have been provided herein relate to visual searches. As described above, text based searches may also be conducted through use of the system 10. For purposes of example, reference is made to FIG. 16, where a search and display window 200 is shown displaying search results of text based searches. In the example provided with reference to FIG. 16, a user enters a search term in the primary search field that is then used to search through the text of the respective electronic files. The search results are then displayed in the primary search results window 230, and the user may engage the search result to receive further information regarding the displayed search result. Secondary searches may be conducted based on a variety of search parameters. For example, secondary searches that are conducted on text based files may search for specific words or paragraphs, or the occurrence of unique words or phrases. Subsequent secondary searches may also be based on finding similar search results based on author type, date (newer or older) and where application based on similarly priced files.

The methods and systems described herein may be used to allow users to conduct searches for various types of subject matter represented through various types of electronic files. The electronic files may be used to implement the system for various purposes including retail and research purposes.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A computer-implemented method of displaying search results in a search and display window, the method comprising:
   a) receiving a primary search term from a user;
   b) determining a primary search result using a processor executing a primary search query, the primary search query comprising the primary search term;
   c) displaying a plurality of primary electronic representations representing at least a subset of data in the primary search result, the plurality of primary electronic representations being displayed in a primary search results portion of the search and display window, wherein each primary electronic representation represents a corresponding datum in the primary search result;
   d) receiving a secondary search query, wherein the secondary search query comprises a user selection of one of the primary electronic representations;
   e) determining a secondary search result using the processor executing the secondary search query, wherein at least a portion of the data in the primary search result is different from the data in the secondary search result, wherein the secondary search result is determined by a visual similarity search on the secondary search query; and
   f) displaying a plurality of secondary electronic representations representing at least a subset of data in the secondary search result, the plurality of secondary electronic representations being displayed in a secondary search results portion of the search and display window, wherein each secondary electronic representation represents a corresponding datum in the secondary search result;
      wherein the plurality of primary electronic representations and the plurality of secondary electronic representations are visible at the same time; and
      wherein the data in the primary search result is unchanged by display of the secondary search result; and
   (g) receiving a subsequent secondary search term, and determining a subsequent secondary search result.

2. The method of claim 1, the method further comprising:
   displaying the one primary electronic representation of the user selection in a feature portion of the search and display window.

3. The method of claim 1, the method further comprising:
   displaying each primary electronic representation selected by the user in a selection history portion of the search and display window.

4. The method of claim 1, wherein the subsequent secondary search term comprises a user selection of another one of the plurality of primary electronic representations.

5. The method of claim 1, wherein the subsequent secondary search term comprises a user selection of one of the plurality of secondary electronic representations.

6. The method of claim 1, the method further comprising:
   displaying a plurality of subsequent secondary electronic representations representing at least a subset of data in the subsequent second secondary search result, wherein the plurality of subsequent secondary electronic representation are displayed in a preview secondary search results portion of the secondary search results portion of the search and display window.

7. The method of claim 5, further comprising:
   displaying each primary electronic representation and each secondary electronic representation selected by the user in the selection history portion of the search and display window.

8. The method of claim 7, further comprising
   receiving a selection of one of the primary or secondary electronic representations displayed in the selection history portion; and
   displaying a previous search result associated with the selection.

9. The method of claim 1, the method further comprising:
   displaying the plurality of secondary electronic representations and the plurality of the primary electronic representations in the primary search result portion of the search and display window; and
   displaying a plurality of subsequent secondary electronic representations representing at least a subset of data in the subsequent secondary search result, wherein the plurality of subsequent secondary electronic representations are displayed in the secondary search results portion of the search and display window.

10. The method of claim 1, wherein step (c) further comprises:
    displaying a first subset of the primary search result for a predetermined amount of time; and
    displaying a next subset of the primary search result after the predetermined amount of time has elapsed.

11. The method of claim 1, wherein the primary search result is determined using a primary search algorithm, and the secondary search result is determined using a secondary search algorithm.

12. The method of claim 11, wherein at least one of the primary search algorithm and the secondary search algorithm is customizable by the user.

13. The method of claim 1, wherein the data is image data, and wherein the primary and secondary electronic representations are thumbnail images.

14. A system for displaying search results in a search and display window, the system comprising:
    a database for storing data in a memory;
    a display adapted to display the search and display window; and
    a processor configured to:
       receive a primary search term;

determine a primary search result by executing a primary search query, wherein the primary search query comprises the primary search term;

display a plurality of primary electronic representations representing at least a subset of data in a primary search result, the plurality of primary electronic representations being displayed in a primary search results portion of the search and display window, wherein each primary electronic representation represents a corresponding datum in the primary search result;

receive a secondary search query, wherein the secondary search query comprises a user selection of one of the primary electronic representations;

determine a secondary search result by executing the secondary search query, wherein at least a portion of the data in the primary search result is different from the data in the secondary search result, wherein the secondary search result is determined by a visual similarity search on the secondary search query; and display a plurality of secondary electronic representations representing at least a subset of data in the secondary search result, the plurality of secondary electronic representations being displayed in a secondary search results portion of the search and display window, wherein each secondary electronic representation represents a corresponding datum in the secondary search result, wherein the plurality of primary electronic representations and the plurality of secondary electronic representations are visible at the same time; and wherein the data in the primary search result is unchanged by display of the secondary search result; and receive a subsequent secondary search term, and determine a subsequent secondary search result.

15. The system of claim 14, wherein the processor is further configured to:
display the one primary electronic representation of the user selection in a feature portion of the search and display window.

16. The system of claim 14, wherein the processor is further configured to:
display each primary electronic representation selected by the user in a selection history portion of the search and display window.

17. The system of claim 14, wherein the at least one subsequent secondary search term comprises a user selection of another one of the plurality of primary electronic representations.

18. The system of claim 14, wherein the at least one subsequent secondary search term comprises a user selection of one of the plurality of secondary electronic representations.

19. The system of claim 14, wherein the processor is further configured to:
display a plurality of subsequent secondary electronic representations representing at least a subset of data in the subsequent second secondary search result, wherein the plurality of subsequent electronic representations is displayed in a preview secondary search results portion of the secondary search results portion of the search and display window.

20. The system of claim 18, wherein the processor is further configured to:
display each primary electronic representation and each secondary electronic representation selected by the user in the selection history portion of the search and display window.

21. The system of claim 20, wherein the processor is further configured to:
receive a selection of one of the primary or secondary electronic representations displayed in the selection history portion; and
display a previous search result associated with the selection.

22. The system of claim 14, wherein the processor is further configured to:
display the plurality of secondary electronic representations and the plurality of the primary electronic representations in the primary search result portion of the search and display window; and
display a plurality of subsequent secondary electronic representations representing at least a subset of data in the subsequent secondary search result in the secondary search results portion.

23. The system of claim 14, wherein the processor is further configured to:
display a first subset of the primary search result for a predetermined amount of time;
display a next subset of the primary search result after the predetermined amount of time has elapsed.

24. The system of claim 14, wherein the primary search result is determined using a primary search algorithm, and the secondary search result is determined using a secondary search algorithm.

25. The system of claim 24, wherein at least one of the primary search algorithm and the secondary search algorithm is customizable by the user.

26. The system of claim 14, wherein the data is image data, and wherein the primary and secondary electronic representations are thumbnail images.

27. A non-transitory computer readable medium comprising instructions for performing a method of displaying search results in a search and display window, the method comprising:
a) receiving a primary search term from a user;
b) determining a primary search result using a processor executing a primary search query, the primary search query comprising the primary search term;
c) displaying a plurality of primary electronic representations representing at least a subset of data in the primary search result, the plurality of primary electronic representations being displayed in a primary search results portion of the search and display window, wherein each primary electronic representation represents a corresponding datum in the primary search result;
d) receiving a secondary search query, wherein the secondary search query comprises a user selection of one of the primary electronic representations;
e) determining a secondary search result using the processor executing the secondary search query, wherein at least a portion of the data in the primary search result is different from the data in the secondary search result, wherein the secondary search result is determined by a visual similarity search on the secondary search query; and
f) displaying a plurality of secondary electronic representations representing at least a subset of data in the secondary search result, the plurality of secondary electronic representations being displayed in a secondary search results portion of the search and display window, wherein each secondary electronic representation represents a corresponding datum in the secondary search result;

wherein the plurality of primary electronic representations and the plurality of secondary electronic representations are visible at the same time; and wherein the data in the primary search result is unchanged by display of the secondary search result; and (g) receiving a subsequent secondary search term, and determining a subsequent secondary search result.

28. The computer readable medium of claim 27, wherein the data is image data, and wherein the primary and secondary electronic representations are thumbnail images.

* * * * *